(12) United States Patent
Gupta et al.

(10) Patent No.: US 12,489,940 B2
(45) Date of Patent: Dec. 2, 2025

(54) SYSTEMS AND METHODS OF PRESENTING VIDEO OVERLAYS

(71) Applicant: Adeia Guides Inc, San Jose, CA (US)

(72) Inventors: Vaibhav Gupta, Karnataka (IN);
Praveen Maurya, Karnataka (IN);
Ashish Gupta, Karnataka (IN); Senthil Kumar Karuppasamy, Bangalore (IN);
Rohit Dhiman, Uttarakhand (IN);
Harshavardhan Kalathuru, Andhra Pradesh (IN); Padmassri Chandrashekar, Karnataka (IN); Daina Emmanuel, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/363,779

(22) Filed: Jun. 30, 2021

(65) Prior Publication Data
US 2023/0007334 A1    Jan. 5, 2023

(51) Int. Cl.
*H04N 21/431* (2011.01)
*H04N 21/81* (2011.01)

(52) U.S. Cl.
CPC ..... *H04N 21/4316* (2013.01); *H04N 21/8126* (2013.01)

(58) Field of Classification Search
CPC .. H04N 21/4316; H04N 21/4622; H04N 5/45; H04N 21/47; H04N 13/178; H04N 21/4728; H04N 21/4882; H04N 13/161; H04N 13/183
See application file for complete search history.

(56) References Cited

U.S. PATENT DOCUMENTS

| | | | |
|---|---|---|---|
| 8,271,675 B2 | 9/2012 | Oh et al. | |
| 11,617,017 B2 | 3/2023 | Gupta et al. | |
| 2002/0196370 A1 | 12/2002 | Dagtas et al. | |
| 2003/0052999 A1 | 3/2003 | Weber | |
| 2006/0150108 A1* | 7/2006 | Adachi | G09G 5/14 715/750 |
| 2007/0033522 A1 | 2/2007 | Lin et al. | |
| 2007/0039021 A1 | 2/2007 | Lee | |

(Continued)

FOREIGN PATENT DOCUMENTS

JP    2009159367 A    7/2009

*Primary Examiner* — Samira Monshi
(74) *Attorney, Agent, or Firm* — HALEY GUILIANO LLP

(57) ABSTRACT

Systems and methods are provided for relocating an overlay overlapping information in content. The systems and methods may comprise receiving a content item, the content item comprising a video image, and determining a first screen position of an information box (e.g., a score box) in the video image. Determining may be performed with image analysis and/or a machine learning model. The system receives an overlay image (e.g., a channel logo) with a second screen position and determines if the second screen position (e.g., for the logo) overlaps the first screen position (e.g., for the score). In response to determining the second screen position (e.g., of the logo) overlaps the first screen position (e.g., the score), the system modifies the second screen position (e.g., for the logo). Then the system generates for display the overlay image on the video in the modified screen position. The system may not relocate the overlay if the overlay is a high priority.

14 Claims, 13 Drawing Sheets

(56) References Cited

U.S. PATENT DOCUMENTS

| | | |
|---|---|---|
| 2007/0260677 A1 | 11/2007 | Demarco et al. |
| 2009/0245568 A1 | 10/2009 | Thelen |
| 2010/0100608 A1 | 4/2010 | Kelly et al. |
| 2011/0202954 A1 | 8/2011 | Oka et al. |
| 2012/0019722 A1 | 1/2012 | Kwisthout et al. |
| 2014/0173661 A1 | 6/2014 | Yamagishi |
| 2014/0215512 A1* | 7/2014 | Maruyama ......... H04N 21/2743 725/34 |
| 2014/0245335 A1 | 8/2014 | Holden et al. |
| 2014/0282670 A1* | 9/2014 | Sinha ................. H04N 21/234 725/19 |
| 2014/0304577 A1 | 10/2014 | St. Pierre et al. |
| 2014/0359656 A1 | 12/2014 | Banica et al. |
| 2015/0172777 A1 | 6/2015 | Park et al. |
| 2015/0326925 A1 | 11/2015 | Ozkan |
| 2016/0029050 A1 | 1/2016 | Thornburgh |
| 2016/0219347 A1* | 7/2016 | Kitahara ............ H04N 21/2541 |
| 2016/0378762 A1 | 12/2016 | Rohter |
| 2017/0034477 A1* | 2/2017 | Morita ..................... H04N 7/15 |
| 2017/0075539 A1 | 3/2017 | Borromeo |
| 2018/0242028 A1 | 8/2018 | Van Brandenburg et al. |
| 2019/0230419 A1 | 7/2019 | Yamagishi |
| 2019/0349626 A1 | 11/2019 | Gupta et al. |
| 2021/0218908 A1* | 7/2021 | Fan .................... H04N 21/4728 |
| 2023/0007335 A1 | 1/2023 | Gupta et al. |
| 2023/0007360 A1 | 1/2023 | Gupta et al. |

* cited by examiner

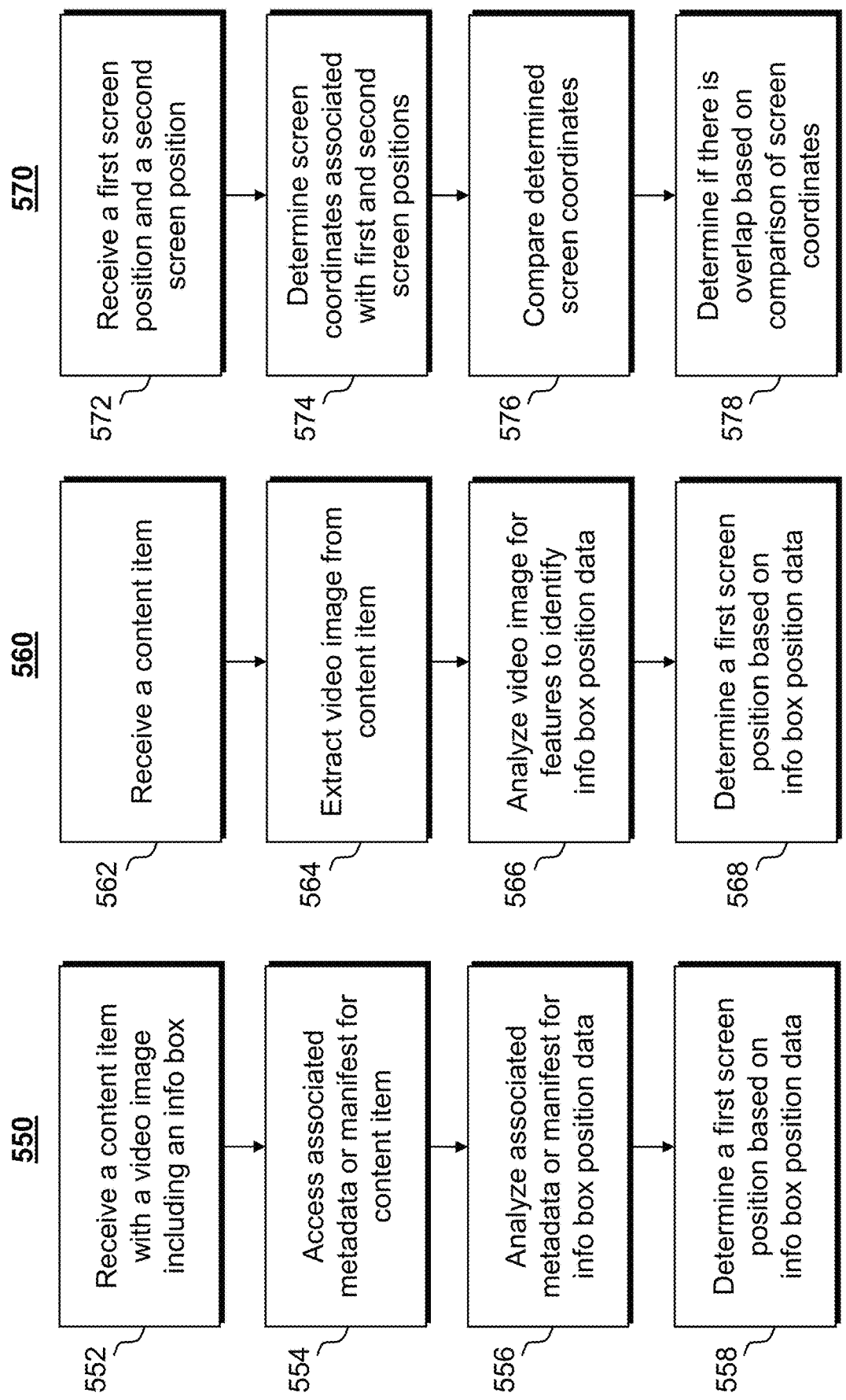

700

SYSTEMS AND METHODS OF PRESENTING VIDEO OVERLAYS

BACKGROUND

The present disclosure relates to content display, and more particularly to systems and related processes for providing content overlays in different screen positions in user interfaces.

SUMMARY

Overlays in video images may cover or block important information, objects, people, or activity in the content. For instance, information boxes, such as sports scores and schedule information, scrolling stocks and financial tickers, calendar information, and/or scrolling news information may be obscured by overlays of network logos, closed captions, or notification displayed on presented content. In some cases, content delivery platforms may cause interfaces to render an overlay that obscures important displayed information or activity. In some cases, content may be produced or distributed by one source and delivered by another platform, potentially causing miscommunication of where on a screen important information may be displayed. Screen real estate is still finite, and overlap can cause the quality of a viewing experience to diminish and displayed information to be lost.

Overlays such as network logos, sports scores, news banners, application identifiers, credits, closed captions, subtitles, advertisements, notifications, and/or supplemental content to be rendered and displayed on the client's side may be placement-agnostic, e.g., positioned without attention to what may be covered by the overlay while displayed on video content. A network logo might overlay and block a sports score displayed in a corner of the screen. For instance, a streaming platform may transmit a soccer game to a client application that overlays a platform logo that covers the game clock or the away team's score. A news stream may inadvertently overlay closed captions over a breaking-news banner. A mobile application may provide a routine notification that blocks key moments of a scrolling stock ticker. The app may suppress an important alert when a notification overlay setting is turned off. A favorite actor or band member may be covered by closed captions. An advertisement may block a penalty kick or golf swing. There exists a need to determine where on-screen zones comprising information, instruments, or activity are located and to relocate overlays that may obfuscate information boxes.

Content delivery systems and interactive program interfaces should not distract or distract from the viewing experience. For instance, TV/video platforms and streaming applications should not obscure key on-screen information, thereby limiting content presentation experience. Presentation issues may diminish content enjoyment, and vital information may be obscured.

Some content, e.g., video, may include on-screen information in the form of an information box. An information box (or "info box") may be found in forms such as sports scores and schedule information (e.g., "sports box"), a scrolling stock or financial ticker, schedule or calendar information, a scrolling news ticker, scrolling descriptions/information, advertisements and sponsors, time and temperature, and other relevant on-screen graphics and text. On-screen information is typically delivered with or as part of the delivered content, but an information box may be added at several points in the production, transmission, and/or broadcast processes, e.g., as a designed overlay over the content. An instrument zone may be a zone on a screen where a key instrument of the content is tracked. For instance, a key instrument might be a ball, bat, base, goal, golf club, favorite or key player, important character, actor, prop, portion of a set, speaker, or important device or person important to the content. An activity zone, for example, may be an area of the screen where an action occurs, such as pitching, shooting, striking of a ball, speaking, running, or otherwise performing. In some embodiments, an instrument zone and an active zone may be determined as and/or defined by a location, e.g., like an information box, for segments of content, which may change (or even disappear).

Info boxes, instrument zones, and/or activity zones in a content item may be obscured by overlays added during content presentation processes. An overlay, for example, may be graphics or text intended to overlay the content and be presented along with the content. An overlay image may be, for instance, a network identifier, channel logo, platform/app icon, captions, subtitles, sponsor logo, notification, or other graphics or text. Overlays may be rendered to overlay content during or after delivery to a client device. Overlays may be positioned anywhere on a screen. Overlays may be placed in a default screen location, come with instructions on where to be positioned on a screen by an interface on a client device, or a screen position may be conveyed separately. For instance, an overlay may be associated with instructions or metadata comprising a screen position such as screen coordinates or a desired screen region. A screen may be considered a two-dimensional coordinate plane, measured in pixels, with the origin at the center. Overlays are typically agnostic of what will be covered when rendered at a client device and, thus, overlaying content can lead to issues of missed information or activity.

In some cases, a network logo may be required to be displayed as an overlay when streaming a particular program produced or distributed by that network. For instance, an online streaming platform may aggregate television programs from various studios and producers and may be required to identify which network the program is associated with by displaying a logo as an overlay to the program. For instance, Hulu may be required to display an NBC logo in a corner when the show "Saturday Night Live" is presented. In some cases, the NBC logo may be required to be the logo of the local NBC affiliate associated with the viewer's location. This logo is an overlay, and it may generally not obscure any information. However, if the program were to be an NFL football game or an Olympic event, there may be a score or other sports information box in a corner. With some networks and platforms, an overlay logo or watermark may be in the same corner as the score information and may potentially obscure it.

With some international sports, for instance, a regional television distributor may receive a live feed of the game score box with the score and game clock and add some commentary and post-production graphics. In some cases, a localized streaming service may add a logo or graphic without seeing where the score and game clock are located. An automatically placed logo overlay may cover the game score. Likewise, some sports highlight clips are generated autonomously or semi-autonomously and logos and/or graphics are occasionally placed without observing where on the screen the score and game clock were placed.

Viewers have grown accustomed to having a score box over the past few decades of televised sports. Overlay overlap may obscure identification of the teams, the time or period in which a highlight occurs, and generally the score of the game at a given point in time. Viewers may be asking if the free kick scored the go-ahead goal in the soccer match or if the three-pointer created a lead or a tie in the basketball game. Not knowing the count for balls and strikes for baseball makes the game very confusing and frustrating for a viewer.

Likewise, with news programs and 24-hour news networks, there are constantly scrolling tickers of information such as headlines, world news, stock prices, financial news, weather, sports scores and transactions, calendar items, and schedules that may be very valuable to viewers. News is no longer just on TV or cable as even local affiliates have 24-7 news networks streaming these days. Some news networks are accessible via third-party applications. If a news program or a news network streamed through a third-party application, for instance, includes a logo overlay, watermark, or an advertisement, there will be some screen overlap and information will be missed by a viewer.

Notifications appearing on every device from televisions to smartphones can behave like obtrusive overlays that cover valuable information. For instance, an incoming text message may cover information such as a stock ticker on a streamed finance show. A upcoming program reminder may pop up and cover a scrolled sports score a viewer was waiting to see. Then, if a user turns off a notification setting, the app may suppress a home security alert, putting people in danger. There exists a need to determine where information boxes are on screen and to relocate overlays that may obscure information boxes.

As discussed herein are systems and methods of relocating an overlay to avoid overlapping information displayed in video content. As an overlay is rendered and positioned, there can be a check to make sure the overlay does not overlap an information box such as a sports score, stock ticker, news banner, or other information. If an overlap is determined, the overlay can be moved and rendered in a different position. A different overlay position may be determined in many ways, but typically may be moved to an opposite corner, side, or horizontal position.

One approach may involve manual recognition of information or activity and movement of an overlay such as a logo or notification. This is not feasible for thousands of networks, individual video streams, and, sometimes, dozens of third-party applications offering access to the same feed and applying their own logo, watermark, or graphics to the stream. As streaming becomes more autonomous, errant overlays will become more of a problem.

Some embodiments may utilize an overlay engine to perform one or more parts of the systems and methods of determining info box location and relocating overlays, e.g., as part of a content delivery platform or interactive content guidance application, stored and executed by one or more of the processors and memory of a device and/or server such as those depicted in FIGS. 6 and 7. For instance, an overlay engine may run on a server of a content delivery platform like a streaming service. An overlay engine may run on a component of a television, set-top box, computer, smartphone, tablet, or other device able to access a content delivery network.

An overlay engine generally may identify screen positions of an information box and an overlay, determine if there is overlap, and relocate an overlay so there is no overlap of the information box. For instance, if a network logo overlay has instructions to be placed on top of or too near a score box in the bottom-right corner, an overlay engine will identify the score box, determine the overlap, and relocate the overlay to a different corner (e.g., the bottom-left corner). By way of another non-limiting example, if a closed caption overlay has instructions to be placed on top of or too near a stock ticker at the bottom of a news program, an overlay engine will identify the stock ticker, determine the overlap, and relocate the closed caption overlay to a different horizontal level (e.g., the top of the screen). In some embodiments, an overlay engine may determine coordinates of good or bad locations to place an overlay as read from a streaming video manifest file defined by content producers or distributors. An overlay engine may render different versions of text and/or graphics of an overlay such as a scoreboard, score ticker, leaderboard, news banner, and/or stock ticker based on the size and resolution of a client device.

In some embodiments, an overlay engine may interpret priority levels and modify overlay location based on priority. For instance, a notification that is urgent, like a home security alert, may be permitted to overlay an information box like a sports score or news ticker. On the other hand, a notification with a reminder that a TV program will begin on another channel in, e.g., 15 minutes is not as urgent as a home security message. In some embodiments, priority levels may be, e.g., "high," "medium," or "low." In some embodiments, priority levels may be on a scale from 1 to 10, with 10 being the highest. An overlay engine may allow certain notifications and pop-up overlays to cover information based on a comparison of priority or a threshold of urgency. Some embodiments may position overlays differently, e.g., forcing overlap, based on an associated high-priority level.

Described herein are systems or methods of providing content comprising receiving a content item, the content item comprising a video image, and determining a first screen position of an information box (e.g., a score box) in the video image. Determining may be performed with image analysis and/or a machine learning model. The system receives an overlay image (e.g., a channel logo) with a second screen position and determines if the second screen position (e.g., for the logo) overlaps the first screen position (e.g., for the score). In response to determining the second screen position (e.g., of the logo) overlaps the first screen position (e.g., the score), the system modifies the second screen position (e.g., for the logo). Then the system generates for display the overlay image on the video in the modified screen position. Some embodiments include information boxes describing sports information, financial information, calendar information, news information, or other text or graphics. Some embodiments include overlay images comprising a network identifier, a producer identifier, closed caption text, subtitle text, scoreboards, sports tickers, a notification, supplemental content, or other text or graphics.

The systems or methods may also determine the first screen position by accessing screen coordinates stored in metadata or a manifest associated with the content item. For instance, a manifest file may identify locations, e.g., coordinates, of positions to move (or not move) an overlay, as well as different sizes or versions of the overlay. Some embodiments may determine the first screen position by identifying, e.g., shapes, stationary text, and/or scrolling text with visual analytics. Some embodiments may determine the first screen position by inputting a video image to a neural network that outputs a screen position when at least one information box is identified.

Some embodiments may determine if the second screen position (e.g., for the logo) overlaps the first screen position (e.g., score) by comparing coordinates associated with each of the first screen position and the second screen position. Some embodiments may change the coordinates to flip the second screen position to an opposite screen position vertically or horizontally. Some embodiments may select different screen positions from a plurality of predetermined screen locations.

Some embodiments may include accessing a priority level associated with the overlay image and selecting a screen position from a plurality of predetermined screen locations based on the priority level.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5B depicts an illustrative flowchart of a process for determining a screen position of an information box in a video image, in accordance with some embodiments of the disclosure;

FIG. 5C depicts an illustrative flowchart of a process for determining a screen position of an information box in a video image, in accordance with some embodiments of the disclosure;

FIG. 5D depicts an illustrative flowchart of a process for determining screen overlap, in accordance with some embodiments of the disclosure;

DETAILED DESCRIPTION

Devices may be designed to facilitate content consumption. Content like video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices. Devices—e.g., computers, telephones, smartphones, tablets, smartwatches, microphones (e.g., with a virtual assistant), activity trackers, e-readers, voice-controlled devices, servers, televisions, digital content systems, video game consoles, and other internet-enabled appliances—can provide and deliver content almost instantly.

Interactive content guidance applications may take various forms, such as interactive television program guides, electronic program guides and/or user interfaces, which may allow users to navigate among and locate many types of content including conventional television programming (provided via broadcast, cable, fiber optics, satellite, internet (IPTV), or other means) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

The interactive guidance provided may be for content available through a television, or through one or more devices, or bring together content available both through a television and through internet-connected devices using interactive guidance. The content guidance applications may be provided as online applications (e.g., provided on a website), or as stand-alone applications or clients on handheld computers, mobile telephones, or other mobile devices. Various devices and platforms that may implement content guidance applications are described in more detail below.

Media devices, content delivery systems, and interactive content guidance applications may utilize input from various sources including remote controls, keyboards, microphones, video and motion capture, touchscreens, and others. For instance, a remote control may use a Bluetooth connection to a television or set-top box to transmit signals to move a cursor.

Figure 1:
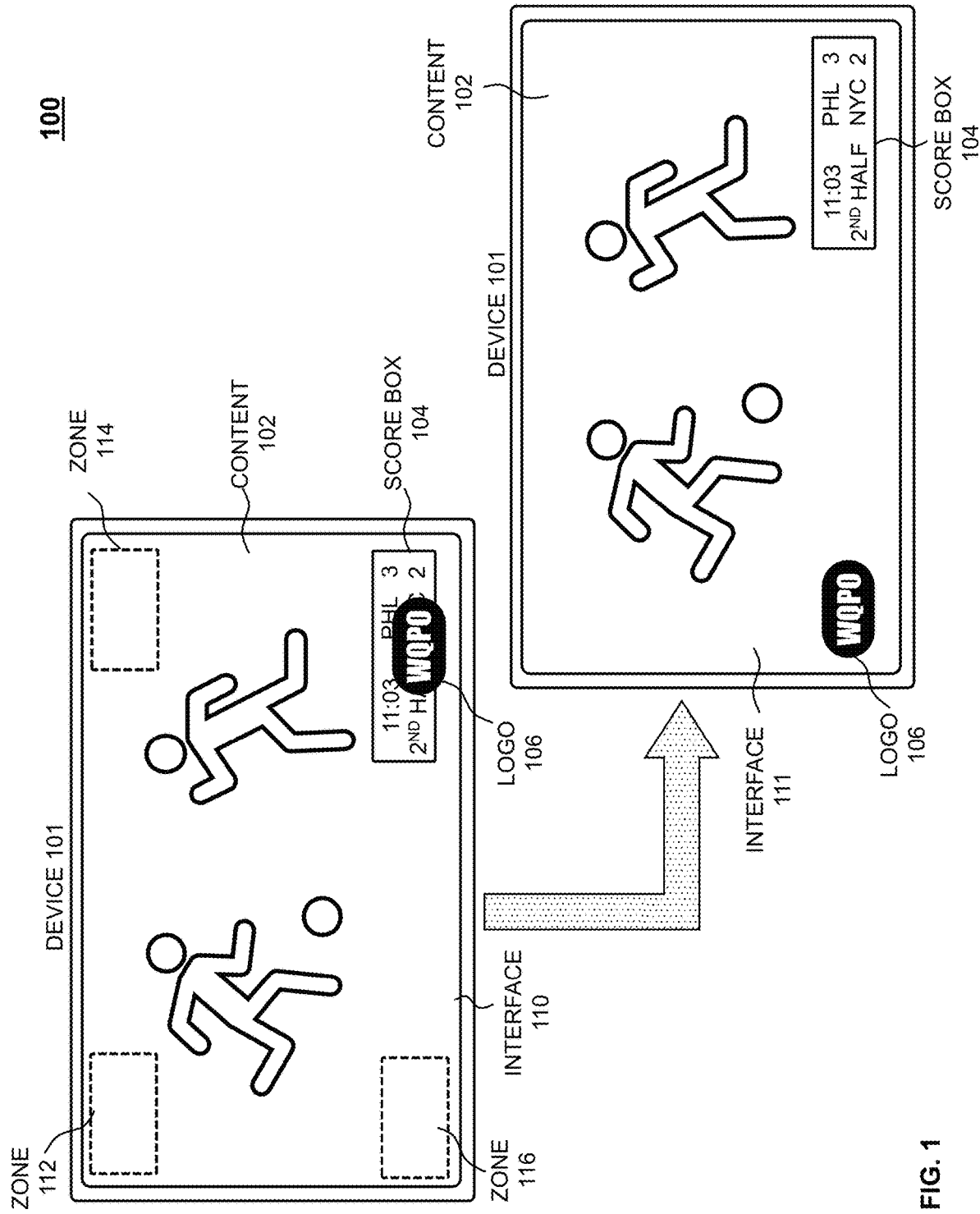
FIG. 1 depicts an illustrative user interface relocating a network logo overlay, in accordance with some embodiments of the disclosure.

FIG. 1 depicts an illustrative user interface relocating a network logo overlay, in accordance with some embodiments of the disclosure. Scenario 100 of FIG. 1 illustrates a user interface, interface 110, of an interactive content guidance application presenting content 102. Scenario 100 of FIG. 1 also illustrates a user interface using overlay relocation as interface 111. In scenario 100, interface 110 and interface 111 are each presented on a screen of device 101. By way of a non-limiting example, scenario 100 may depict determining and modifying a screen position of an overlay for relocation on a screen. For instance, interface 110 may present an information box that may be covered by a network logo. In interface 111, however, the network logo is relocated and the information box is not obscured by the logo.

Figure 5A:
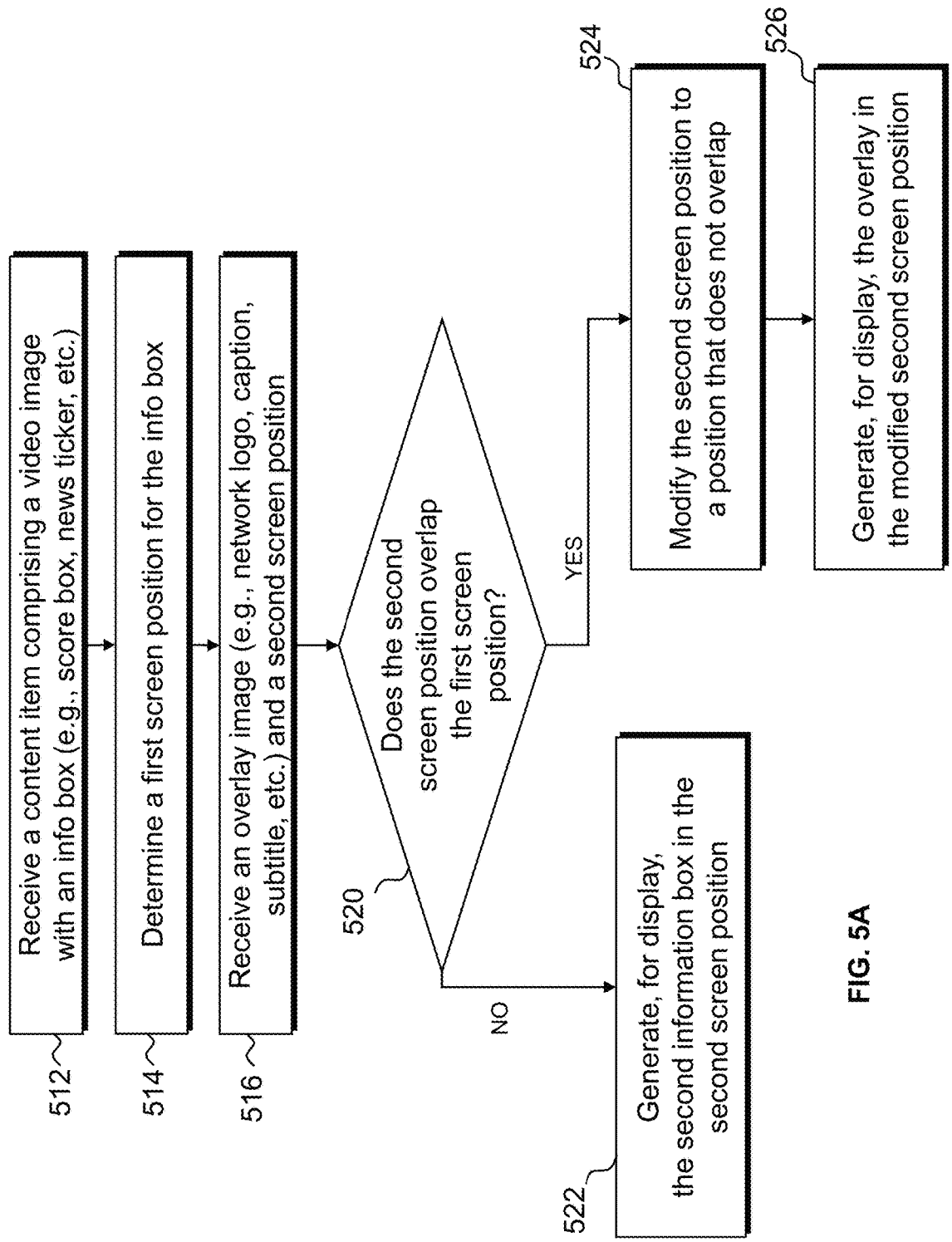
FIG. 5A depicts an illustrative flowchart of a process for relocating an overlay, in accordance with some embodiments of the disclosure.
Figure 6:
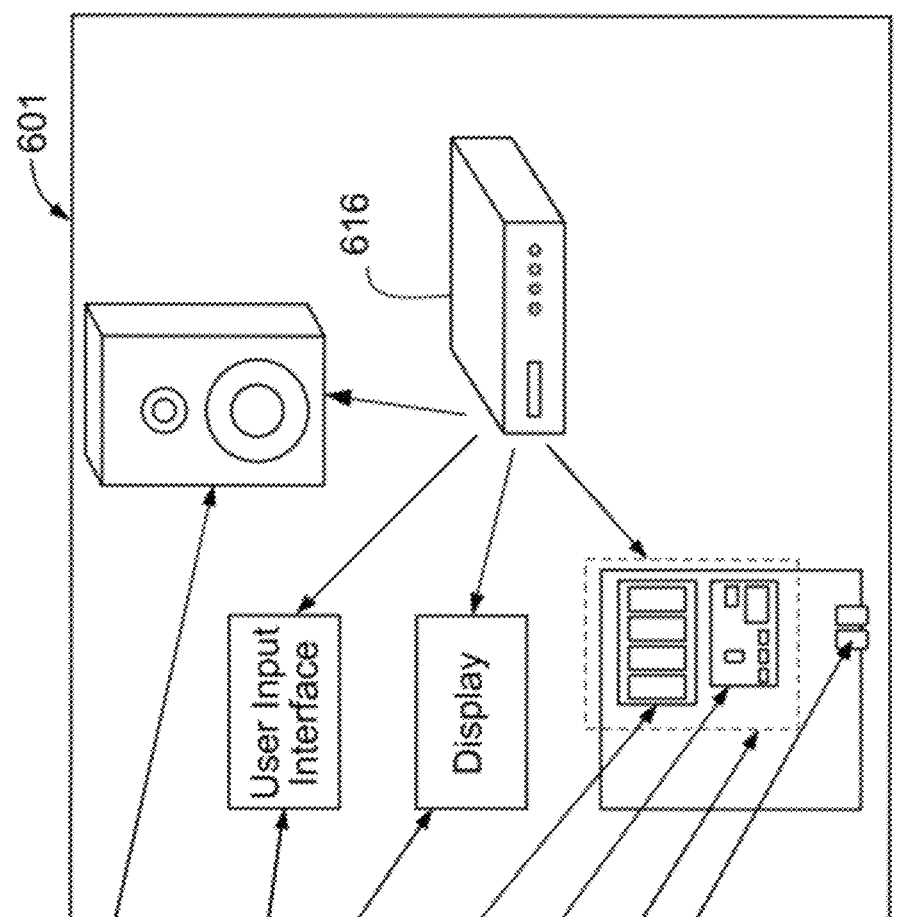
FIG. 6 is a diagram of illustrative devices, in accordance with some embodiments of the disclosure.
Figure 6:
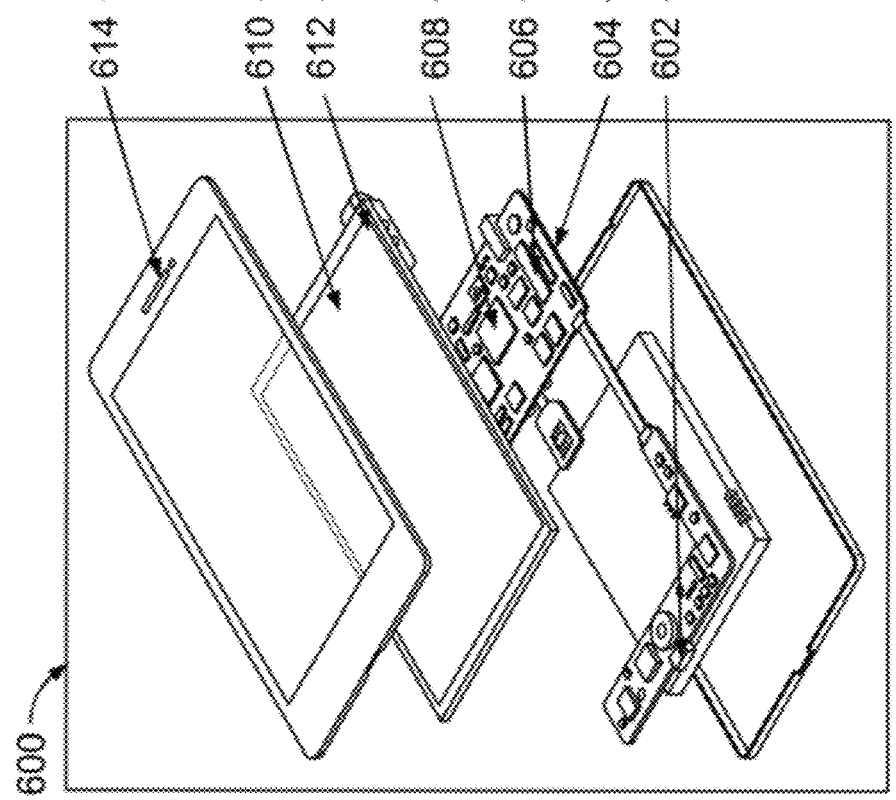
Figure 7:
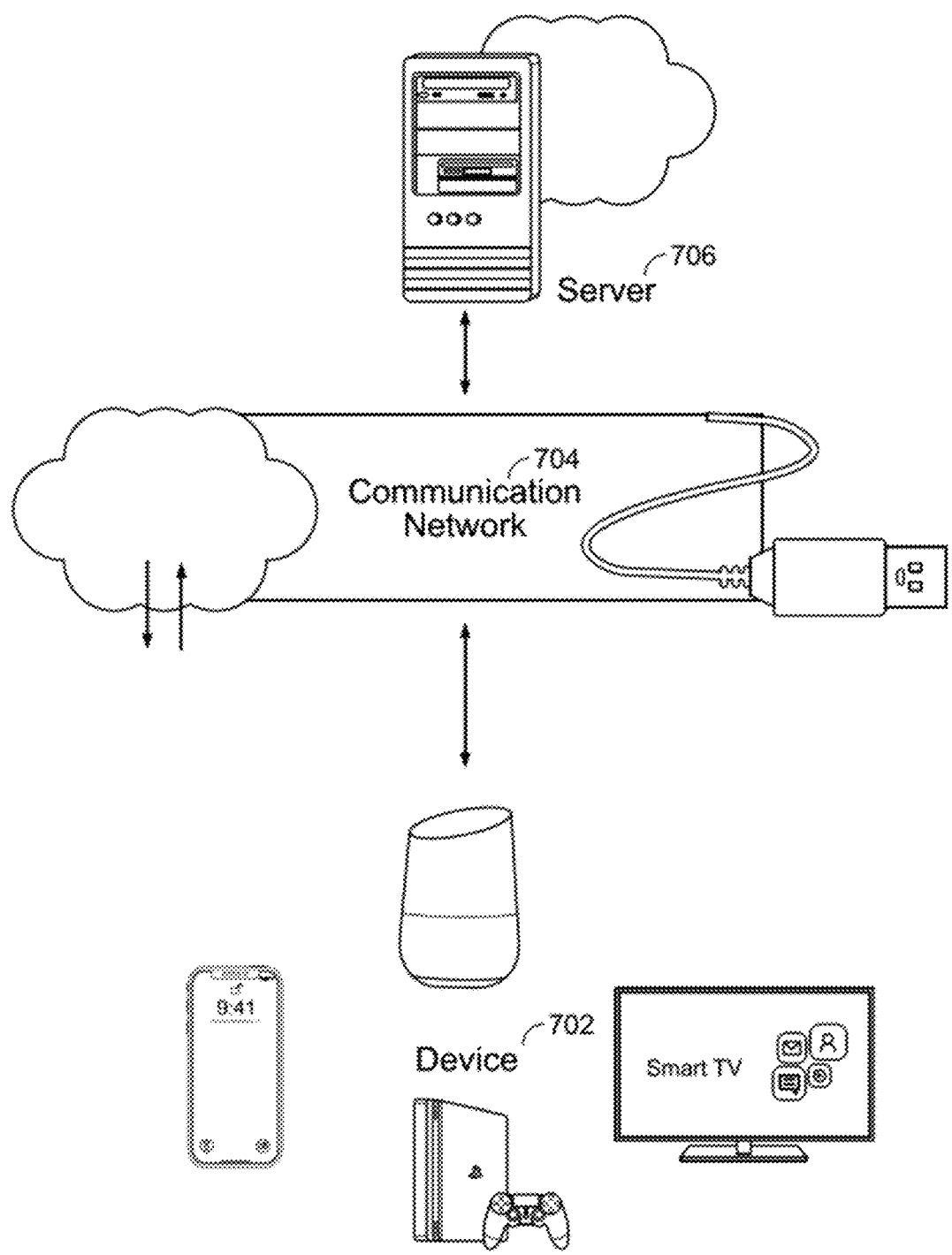
FIG. 7 is a diagram of an illustrative system, in accordance with some embodiments of the disclosure.

Exemplary processes such as determining a screen position of an information box, determining screen overlap, and relocating an overlay are described in FIGS. 5A-D and may be carried out by an overlay engine, e.g., as part of a content delivery platform or interactive content guidance application, stored and executed by one or more of the processors and memory of a device and/or server such as device 101 and devices depicted in FIGS. 6 and 7.

Interface 110 depicts providing content 102 for consumption via interface 110 on device 101. For instance, content 102 may be a soccer game between Philadelphia and New York City that a viewer is watching on device 101. Device 101 may be, for instance, a television, set-top box, computer, smartphone, tablet, or other device able to access a content delivery network that provides interface 110 and content 102. Interface 110 may be a part of a content delivery platform or interactive content guidance application, stored and executed by one or more of the processors and memory of a device and/or server such as those depicted in FIGS. 6 and 7. Content 102 may be delivered via a content delivery system using one or more of cable, fiber, satellite, antenna, streaming over IP, wireless, or other content delivery methods. Content 102 may be captured live for live broadcast and/or streaming.

Interface 110, for example, displays an information box in the form of score box 104 in the lower-right corner of the screen. A score box may also be known as a score bar, score bug, score table, game score, and other names that describe a digital on-screen graphic depicting game information. Score box 104 may include, e.g., a game score "PHL 3, NYC 2"), game time ("11:03"), game period ("2nd Half"), and more. An information box such as score box 104 is typically included as part of and delivered with content 102, such as in scenario 100, but a score box may be added at several points in the production, transmission, and/or broadcast processes as a designed overlay over the content. Score box 104 is an exemplary information box that appears on screen and other on-screen graphics and information like news banners, stock scrollers, advertisements, open and closed captions, subtitle text, and other on-screen text and information—each of which may be treated like score box 104 in interfaces 110 and 111. Information boxes are considered important on-screen information that should not needlessly be covered with an additional overlay.

In interface 110 of scenario 100, logo 106 is blocking score box 104. For instance, logo 106 may be a network identifier, channel logo, platform/app icon, sponsor logo, or other graphic intended to overlay content 102 and be visible as the content is provided via interface 110. In some embodiments, logo 106 may be a logo of a local affiliate of a national broadcast network and the logo must be shown due to licensing restrictions between the broadcast network and, e.g., a streaming platform depicting logo 106. In some embodiments, content 102 may be transmitted globally via satellite and internet, e.g., as part of an international competition, and logo 106 may identify a regional carrier of content 102 rather than the original broadcaster, studios, producers, or network. In some cases, logo 106 may indicate a corporate sponsor for a portion of a game. In some embodiments, logo 106 may include additional information about the game, such as a player receiving a penalty, and may need to be localized and added as an overlay on (or closer to) the consumer end. In scenario 100, logo 106 is an additional overlay and score box 104 is part of content 102. In some embodiments, logo 106 and score box 104 may both be overlays to content 102, but score box 104 may be more valuable to a viewer.

In some embodiments, interface 110 must determine the location of score box 104. In some cases, metadata associated with content 102 will identify a region or screen coordinates where score box 104 appears. For instance, content 102 may have a streaming manifest with XML, code identifying the coordinates of the box around score box 104 for the entirety of content 102. In some cases, metadata associated with the content may be accessed or transmitted and interpreted to find the screen location of the information box. FIG. 5B depicts an illustrative flowchart of an exemplary process for determining a screen position of an information box in a video image.

In some embodiments, determination of the location of score box 104 may require visual processing and analysis. For instance, score box 104 may be identified using feature analysis and identifying the box shape. In some embodiments, score box 104 may be identified by stationary text and using optical character recognition (OCR). In some cases, score box 104 may be identified by comparing a plurality of frames and determining what shapes and/or text do not change from frame to frame. In some embodiments, identifying that part of a frame includes an information box (e.g., score box 104) can be applied to a full image to determine a zone, subsection, and/or coordinates of the image that contain an information box. FIG. 5C depicts an illustrative flowchart of an exemplary process for determining a screen position of an information box in a video image.

In some embodiments, a machine learning algorithm may be applied to a neural network to generate a predictive model able to identify information boxes like score box 104. FIG. 5F describes a process to train a model to label and/or categorize video images including information boxes. In some embodiments, a combination of a neural network and image analysis may be used to determine coordinates of an info box. For instance, a neural network may be used to identify if a subsection of a frame includes an info box, and image analysis tools can match the subsection to a region of the frame and determine the coordinates.

Logo 106, in interface 110 of scenario 100, is in the lower-right portion of the screen and is blocking score box 104. FIG. 1 also identifies three other exemplary portions of the screen, where logo 106 could be overlayed, such as zone 112 (top-left), zone 114 (top-right), and zone 116 (bottom-left). Each of the zones are identified with a dashed-line box in FIG. 1 but those zones are typically invisible when presented via interface 110. Each of zones 112, 114, and 116 offer alternatives for logo 106 that would not obscure score box 104. Locations of zones 112, 114, and 116 are in the screen corners in order to minimize concealment of content 102. In some embodiments, there may be more zones for relocating logo 106, such as dividing the screen into nine (9) roughly equal rectangles.

In interface 111 of scenario 100, logo 106 is not blocking score box 104. In interface 111 of scenario 100, logo 106 overlays content 102 in zone 116 (bottom-left) of the screen. Relocating logo 106 for interface 111 may depend on identifying score box 104 in interface 110 and identifying that at least one of zones 112, 114, and 116 is not masking an information box. FIGS. 5A-D describe exemplary processes for determining a screen position of an information box, determining screen overlap, and relocating an overlay.

In some embodiments, logo 106 may be larger or a different shape than any illustrated available zones. In such cases, logo 106 may need to overlay near/outside of the zone, overlay multiple (adjacent) zones, or be adjusted in size to fit as part of the location modification.

Figure 2:
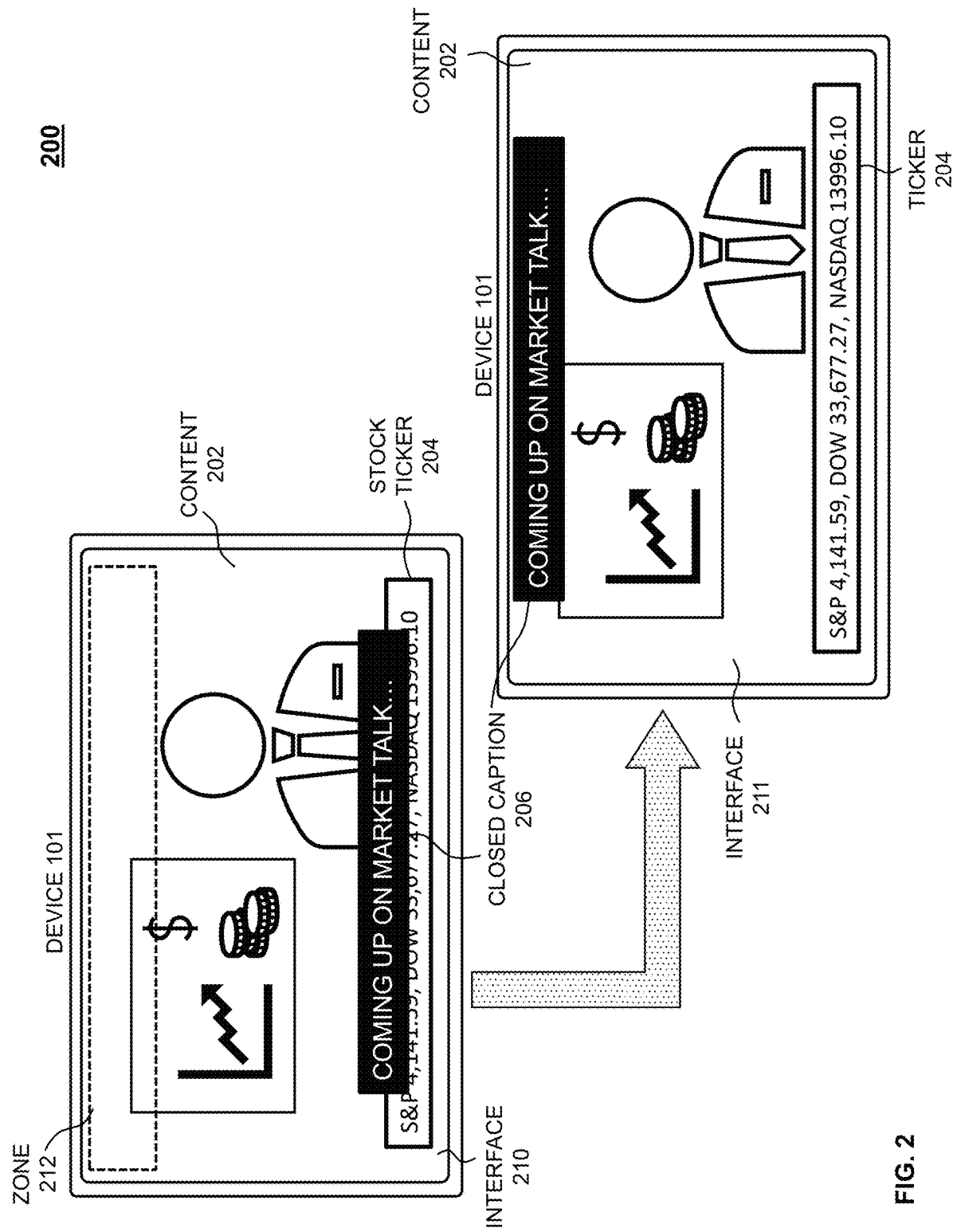
FIG. 2 depicts an illustrative user interface relocating a closed caption overlay, in accordance with some embodiments of the disclosure.

FIG. 2 depicts an illustrative user interface relocating a closed caption overlay, in accordance with some embodiments of the disclosure. Scenario 200 of FIG. 2 illustrates a user interface, interface 210, of an interactive content guidance application presenting content 202. Scenario 200 of FIG. 2 also illustrates a user interface using overlay relocation as interface 211. In scenario 200, interface 210 and interface 211 are each presented on a screen of device 101. By way of a non-limiting example, scenario 200 may depict determining and modifying a screen position of an overlay for relocation on a screen. For instance, interface 210 may present an information box that may be covered by, e.g., closed captions. In interface 211, however, the closed captions are relocated, and the information box is not obscured by the captions.

Exemplary processes such as determining a screen position of an information box, determining screen overlap, and relocating an overlay are described in FIGS. 5A-D and may be carried out by an overlay engine, e.g., as part of a content delivery platform or interactive content guidance application, stored and executed by one or more of the processors and memory of a device and/or server such as device 101 and devices depicted in FIGS. 6 and 7.

Interface 210 depicts providing content 202 for consumption via interface 210 on device 201. For instance, content 202 may be a business news show "Market Talk" that a viewer is watching on device 101.

Interface 210, for example, displays an information box in the form of stock ticker 204 along the bottom of the screen. Stock ticker 204 is an exemplary information box that appears on screen. Some embodiments may feature other on-screen graphics and information like news banners, scrolling sports scores, sponsors/advertisements, closed captions, subtitle text, and other on-screen text and information—each of which may be treated like stock ticker 204 in interfaces 210 and 211. A stock ticker in scenario 200 may be considered a stand-in for a scrolling news ticker, a score bar, or other important on-screen information that should not unnecessarily be covered with an additional overlay. Stock ticker 204 may include, e.g., market or financial information such as values like "S&P 4,141.59, DOW 33,677.27, NASDAQ 13996.10" and more. An information box such as stock ticker 204 is typically included as part of and delivered with content 202, such as in scenario 200, but a ticker may be added at several points in the production, transmission, and/or broadcast processes as a designed overlay over the content. However, information boxes like stock ticker 204 are not intended to have further overlays concealing them.

In interface 210 of scenario 200, closed caption 206 is blocking stock ticker 204. Closed captions may be considered, for instance, a text version of the audio portions of a television program, movie, or multimedia presentation. Closed captioning is generally intended to aid hearing-impaired people, but maybe useful for a variety of situations where full audio is not available and/or appropriate. Closed caption 206 is an example of closed captions that are easy to see and read because of the black background and white text. Closed caption 206 is an example of an overlay generated by the user interface application, e.g., interfaces 210 and 211. In some embodiments, rather than text, closed caption 206 may be substituted with a notification, network identifier, channel information, platform/app information, sponsor information or logo, or other text and/or graphics intended to overlay content 202 and be visible as the content is provided via interface 210. In some embodiments, closed caption 206 may be localized subtitles for a foreign-language portion of a news program. In some embodiments, content 202 may be transmitted globally via satellite and internet, e.g., as part of an international program, and closed caption 206 may include localized information rather than information intended for the region of the original broadcaster, studios, producers, or network. In some cases, closed caption 206 may include an advertisement or indicate corporate sponsor for a portion of a program. In some embodiments, closed caption 206 may include additional information about the program, such as favorite stocks not featured on the program's ticker but needing to be added as a regionalized or personalized overlay for consumption.

In some embodiments, interface 210 must determine the location of stock ticker 204. In some cases, metadata associated with content 202 will identify a region or screen coordinates where stock ticker 204 appears. For instance, content 202 may have a streaming manifest with XML, code identifying the coordinates of the box around stock ticker 204 for the entirety of content 202. In some cases, metadata associated with the content may be accessed or transmitted and interpreted to find the screen location of the information box.

In some embodiments, determination of the location of stock ticker 204 may require visual processing and analysis. In some embodiments, stock ticker 204 may be identified using feature analysis and identifying the box shape. In some embodiments, a machine learning algorithm may be applied to a neural network to generate a predictive model able to identify information boxes like stock ticker 204. FIG. 5F describes a process to train a model to label and/or categorize video images including information boxes. In some embodiments, a combination of a neural network and image analysis may be used to determine coordinates of an info box.

Closed caption 206, in interface 210 of scenario 200, is in the bottom portion of the screen and is blocking stock ticker 204. FIG. 2 also identifies another exemplary portion of the screen, where closed caption 206 could be overlayed, such as zone 212 (top), identified with a dashed-line box in FIG. 2. In typical embodiments, zones are typically invisible when presented via interface 210, and no dashed line appears. Zone 212 offers an alternative for closed caption 206 that would not obscure stock ticker 204. In some embodiments, there may be more zones for positioning closed caption 206, such as dividing the screen into three to five roughly equal rectangles.

In interface 211 of scenario 200, closed caption 206 is not blocking stock ticker 204. In interface 211 of scenario 200, closed caption 206 overlays content 202 in zone 212 (top) of the screen. Relocating closed caption 206 for interface 211 may depend on identifying stock ticker 204 in interface 210 and identifying that zone 212 would not mask an information box. FIGS. 5A-D describe exemplary processes for determining a screen position of an information box, determining screen overlap, and relocating an overlay.

In some embodiments, closed caption 206 may be larger or a different shape than an illustrated available zone. In such cases, closed caption 206 may need to overlay near/outside of the zone, overlay multiple (adjacent) zones, or be adjusted in size to fit as part of the location modification.

Figure 3:
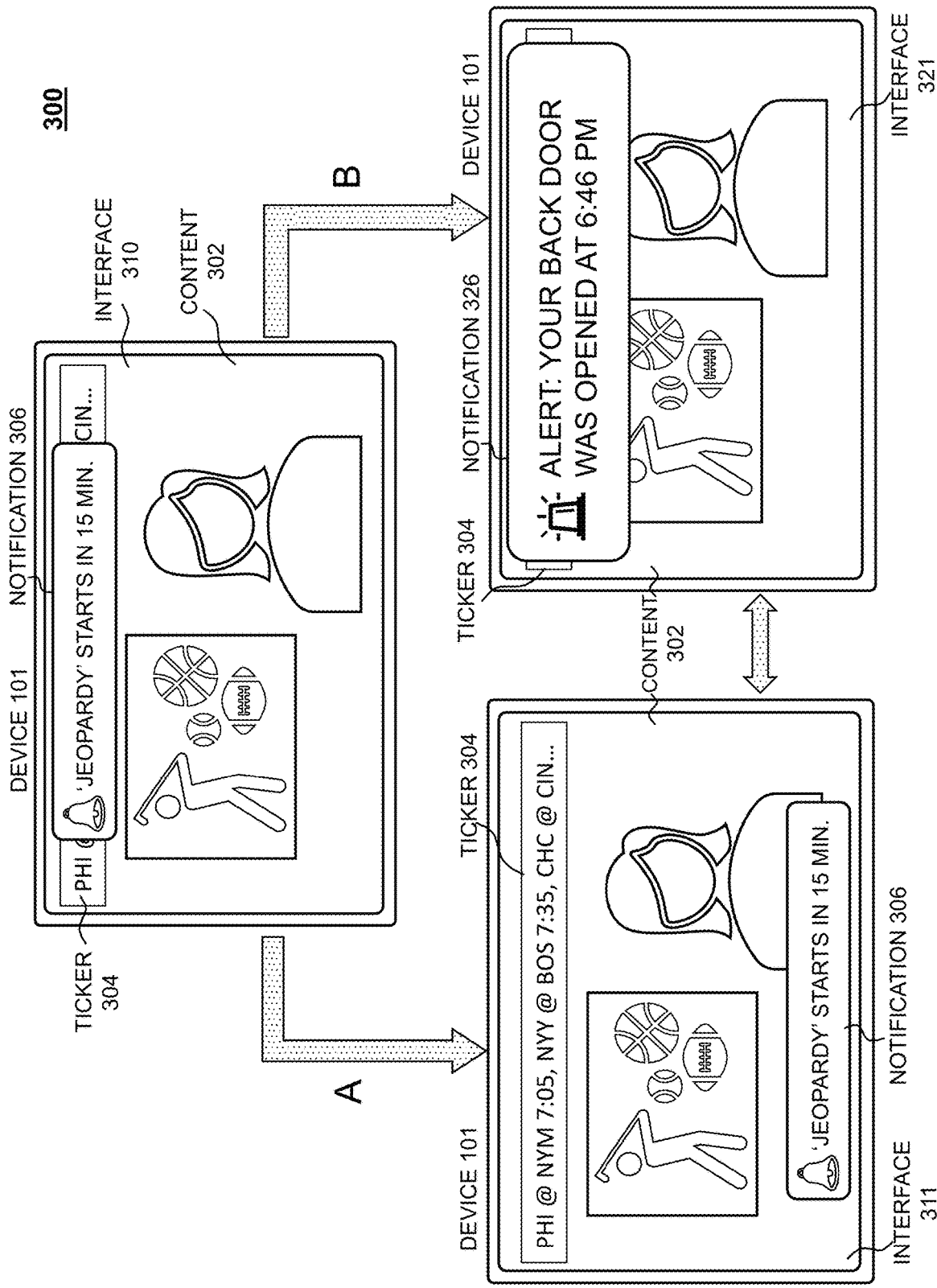
FIG. 3 depicts an illustrative user interface for relocating notification overlays, in accordance with some embodiments of the disclosure.

FIG. 3 depicts an illustrative user interface for relocating notification overlays, in accordance with some embodiments of the disclosure. Scenario 300 of FIG. 3 illustrates a user interface, interface 310, of an interactive content guidance application presenting content 302. Scenario 300 of FIG. 3 also illustrates a user interface using overlay relocation as interface 311. In scenario 300, interface 310, interface 311, and interface 321 are each presented on a screen of device 101. By way of a non-limiting example, scenario 300 may depict determining and modifying a screen position of an overlay for relocation on a screen based on a priority level of the overlay. For instance, interface 310 may present an information box, e.g., a sports ticker, that may be covered by, e.g., a reminder notification or an alert. In interface 311, however, the reminder notification is relocated and the information box is not obscured by the reminder notification. In interface 321, a home security alert—e.g., alert 326, with higher priority—is permitted to obscure the information box.

Exemplary processes such as determining a screen position of an information box, determining screen overlap, and relocating an overlay are described in FIGS. 5A-E and may be carried out by an overlay engine, e.g., as part of a content delivery platform or interactive content guidance application, stored and executed by one or more of the processors and memory of a device and/or server such as device 101 and devices depicted in FIGS. 6 and 7.

Interface 310 depicts providing content 302 for consumption via interface 310 on device 301. For instance, content 302 may be a sports news show "Sports Talk" that a viewer is watching on device 101.

Interface 310, for example, displays an information box in the form of sports ticker 304 along the bottom of the screen. Sports ticker 304 is an exemplary information box that appears on screen. Some embodiments may feature other on-screen graphics and information such as news banners, stock scrollers, sponsors/advertisements, closed captions, subtitle text, and other on-screen text and information—each of which may be treated like sports ticker 304 in interfaces 310, 311, and 321. A sports ticker in scenario 300 may be considered a stand-in for a scrolling news ticker, a score bar, or other important on-screen information that should not unnecessarily be covered with an additional overlay. Sports ticker 304 may include, e.g., sports scores and schedule information such as "PHI @ NYM 7:05, NYY @ BOS 7:35, CHC @ CIN . . . " and more. An information box such as sports ticker 304 is typically included as part of and delivered with content 302, such as in scenario 300, but a ticker may be added at several points in the production, transmission, and/or broadcast processes as a designed overlay over the content. However, information boxes like sports ticker 304 are not intended to have further overlays concealing them.

In interface 310 of scenario 300, notification 306 is blocking sports ticker 304. Notification 306 is an example of an overlay generated by the user interface application, e.g., interfaces 310 and 311. In some embodiments, notification 306 may be a reminder for a program or other content about to begin, e.g., "'JEOPARDY' STARTS IN 15 MIN." In some cases, notification 306 may be a phone call, message, alert, alarm, update, email, voicemail, location-based notification, navigation directions, or other application notification, e.g., a push notification. In some embodiments, notification 306 may be substituted with closed captions, a network identifier, channel information, platform/app information, sponsor information or logo, or other text and/or graphics intended to overlay content 302 and be visible as the content is provided via interface 310. In some cases, notification 306 may include an advertisement or indicate a sponsor for a portion of a program. In some embodiments, notification 306 may include additional information about the program, such as on-screen personalities and actor information, film locations, or other credits.

In some embodiments, interface 310 must determine the location of sports ticker 304. In some cases, metadata associated with content 302 will identify a region or screen coordinates where sports ticker 304 appears. For instance, content 302 may have a streaming manifest with XML code identifying the coordinates of the box around sports ticker 304 for the entirety of content 302. In some cases, metadata associated with the content may be accessed or transmitted and interpreted to find the screen location of the information box.

In some embodiments, determination of the location of sports ticker 304 may require visual processing and analysis. In some embodiments, sports ticker 304 may be identified using feature analysis and identifying the box shape. In some embodiments, a machine learning algorithm may be applied to a neural network to generate a predictive model able to identify information boxes like sports ticker 304. FIG. 5F describes a process to train a model to label and/or categorize video images including information boxes. In some embodiments, a combination of a neural network and image analysis may be used to determine coordinates of an info box.

Notification 306, in interface 310 of scenario 300, is in the top portion of the screen and is blocking sports ticker 304. FIG. 3 may also identify an exemplary portion of the screen where notification 306 could be overlayed, such as the bottom. In some embodiments, there may be more zones for possibility of moving notification 306, such as dividing the screen into 3 to 5 roughly equal rectangles.

In some embodiments, a notification may be relocated or permitted to cover an information box based on priority. For instance, notification 306 may be a low-priority notification, such as a reminder for a program or other content about to begin, e.g., "'JEOPARDY' STARTS IN 15 MIN." A notification may be a high-priority notification, such as a home security alert like notification 326 notifying "ALERT: YOUR BACK DOOR WAS OPENED AT 6:46 PM." A low-priority notification may be relocated to not overlap an information box, while a high-priority notification may be allowed to cover an information box and/or more of the content.

In interface 311 of scenario 300, notification 306, a low-priority notification, is not permitted to block sports ticker 304. In interface 311 of scenario 300, notification 306 overlays content 302 in the bottom of the screen. Relocating notification 306 for interface 311 may depend on identifying sports ticker 304 in interface 310 and identifying that placing an overlay at the bottom would not mask an information box. FIGS. 5A-E describe exemplary processes for determining a screen position of an information box, determining screen overlap, and relocating an overlay.

In some embodiments, a notification may have higher priority than an information box and an overlay may be permitted. In interface 321 of scenario 300, notification 326 is permitted to block sports ticker 304. In interface 321 of scenario 300, notification 326 overlays content 302 in the top of the screen. Permitting notification 326 for interface 321 to overlay sports ticker 304 may depend on identifying sports ticker 304 in interface 310 and accessing priority levels for each of notification 326 and sports ticker 304. For instance, priority levels may be a scale of 1-10, with 10 being the highest priority, or a scale with low, medium, and high as values. In some embodiments, a home security alarm may be a "high" priority or a rating between 8 and 10 on the scale of 1 to 10. In some embodiments, a reminder notification alerting a viewer to the start of a program in 15 minutes might be a "low" or "medium" priority or priority of 5 or lower on the scale of 1 to 10 depending on, for example, the program and the time until the program starts. FIG. 5E describes exemplary processes for determining priority and permitting/relocating an overlay.

In some embodiments, ticker 304 may have a priority level and notification 306 or notification 326 may be permitted to overlay if the respective priority level is higher. For instance, ticker 304 may have a priority level 5 (on a 1 to 10 scale) and notification 306 (priority level 4) might be relocated while notification 326 (priority level 9) may be permitted to overlay ticker 304 or may flash, highlight, or animate to get a user's attention. In some embodiments, content 302 may have a priority level 5, so ticker 304 may have a priority level based on that level, e.g., 5. In some embodiments, content 302 and/or ticker 304 may have a default priority level such as "medium" or 5 on a scale of 1 to 10.

Figure 4A:
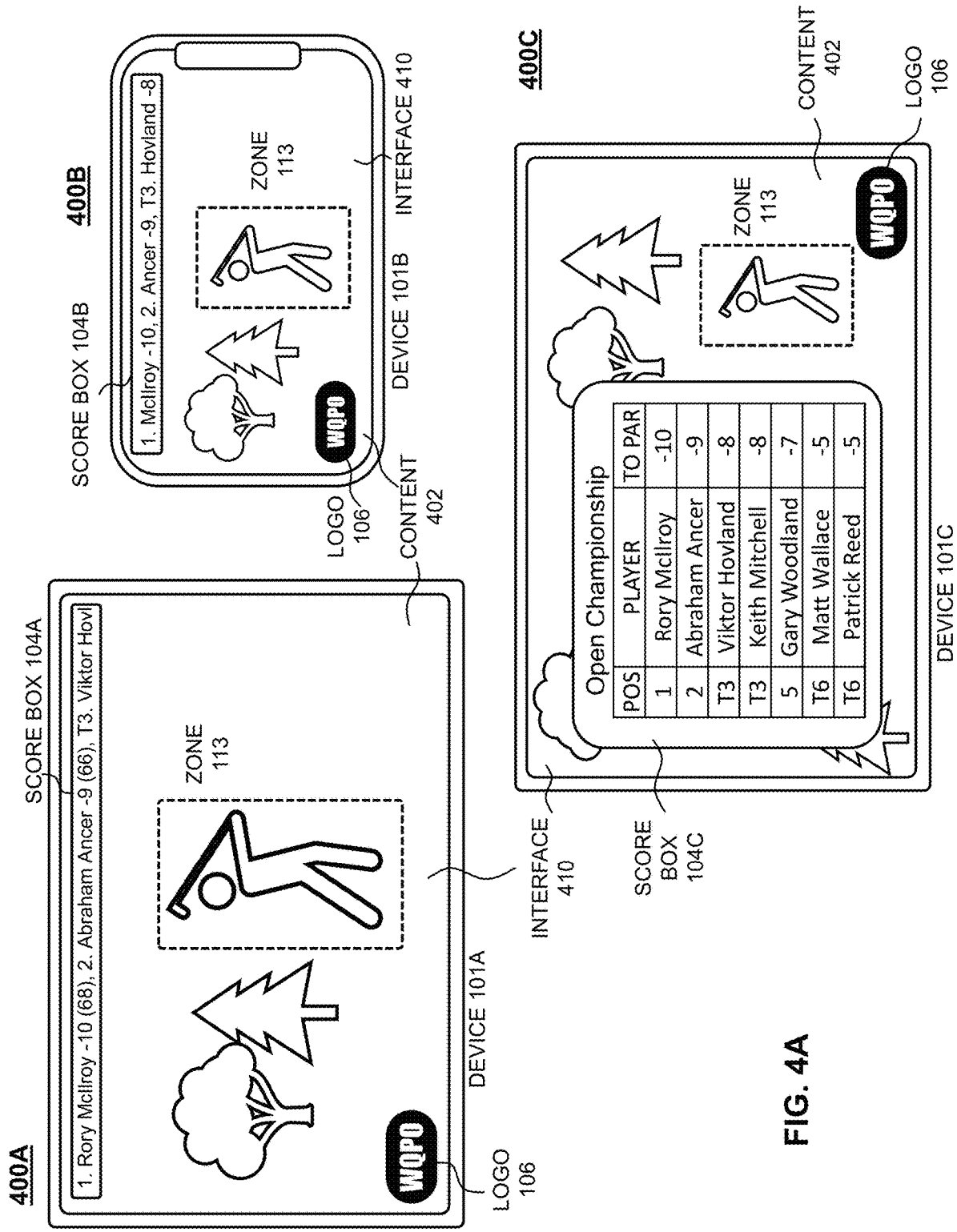
FIG. 4A depicts an illustrative user interface for modifying overlay size, in accordance with some embodiments of the disclosure.

FIG. 4A depicts illustrative user interfaces for modifying overlay size, in accordance with some embodiments of the disclosure. Each of scenario 400A, scenario 400B, and scenario 400C of FIG. 4A illustrates a user interface, interface 410, of an interactive content guidance application presenting content 402. Interface 410, in some embodiments, may comprise or act with an overlay engine. By way of non-limiting examples, scenarios 400A-C may depict modifying an overlay to not cover important screen areas. scenarios 400A-C may also depict modifying an overlay for proper size and resolution on a respective screen. For instance, interface 410 may present content 402 that may be covered by an information box such as score box 104A. In scenario 400B, on a smaller screen of device 101B, score box 104B may be smaller. In scenario 400C, e.g., on a bigger, higher-resolution screen of device 101C, score box 104B may take a different form.

Each of scenario 400A, scenario 400B, and scenario 400C of FIG. 4A depicts providing content 402 for consumption via interface 410. For instance, content 402 may be a golf tournament that a viewer is watching on one of devices 101A-C. Devices 101A-C may be, for instance, a television, set-top box, computer, smartphone, tablet, or other device able to access a content delivery network that provides interface 410 and content 402. For example, device 101A and device 101C are each depicted as a television, and device 101B is depicted as a smartphone. Device 101A may be a high-resolution television, e.g., compatible with 1080P or 4K resolutions. Device 101B, in FIG. 4A, may have a high resolution but is a smaller size. Interface 410 may be a part of a content delivery platform or interactive content guidance application, stored and executed by one or more of the processors and memory of a device and/or server such as those depicted in FIGS. 6 and 7. Content 402 may be delivered via a content delivery system using one or more of cable, fiber, satellite, antenna, streaming over IP, wireless, or other content delivery methods. Content 402 may be captured live for live broadcast and/or streaming.

Interface 410, for example, displays an information box in the form of score box 104A in the top portion of the screen in scenario 400A. Interface 410 displays score box 104B in the top portion of the screen in scenario 400B. Interface 410 displays score box 104B in the top portion of the screen in scenario 400B. A score box may also be known as a leaderboard, score ticker, score bar, score bug, score table, game score, and other names that describe a digital on-screen graphic depicting game information. Each of score boxes 104A-C is depicted as text and/or graphics overlayed by interface 410 over content 402.

In scenario 400A, device 101A is depicted as a television with ample screen size. In scenario 400A, interface 410 determines, based on the device's screen size and resolution, to generate score box 104A as a large score ticker. In scenario 400B, device 101B is depicted as a smartphone with smaller screen size (e.g., compared to a television). In scenario 400B, interface 410 determines, based on the device's small screen size and resolution, to generate score box 104B as a small score ticker.

In some embodiments, interface 410 may determine the size and location of score box 104A-C based on detection of zone 113. Zone 113 may be, for instance, an area of content 402 where there is action (e.g., an active zone). In some embodiments, zone 113 may be, for instance, an area of content 402 with a particular instrument of interest such as a person (e.g., player or actor) or object (e.g., ball or microphone). In some embodiments, interface 410 may treat an instrument or active zone, such as zone 113, like an info box that should not have an overlay on top of it. For instance, interface 410 may determine a screen position of zone 113 as an information box in a video image and adjust the position of overlays accordingly. In some cases, content 402 may include a manifest describing zone 113 as an off-limits area for overlays such as score box 104A. In some embodiments, identifying that part of a frame includes a type of zone (e.g., zone 113) can be applied to a full image to determine a zone, subsection, and/or coordinates of the image that comprises an instrument or active zone. FIGS. 5B and 5C depict illustrative flowcharts of exemplary processes for determining a screen position of, e.g., an information box in a video image that may be applied for a zone including an instrument or active area.

In scenario 400C, device 101C is a television, and a large score box 104C may be presented. In some embodiments, the interface may use a large score box (e.g., leaderboard) when it won't overlay or interfere with important content on screen. In scenario 400C, zone 113 is an active zone (or instrument zone) determined to be on the right side of the screen of interface 410. In some embodiments, interface 410 may determine that score box 104C may be presented on screen without blocking zone 113.

In some embodiments, logo 106 and score box 104A-C may both be overlays to content 402. For instance, logo 106 may be a network identifier, channel logo, platform/app icon, sponsor logo, or other graphic intended to overlay content 402 and be visible as the content is provided via interface 410. In some cases, logo 106 may indicate a corporate sponsor for a portion of a game. In some embodiments, logo 106 may include additional information about the game, such as a player featured on screen. In some embodiments, the interface will not allow any overlay to cover important on-screen information. Logo 106 may be treated by interface 410 like logo 106 in scenario 100 of FIG. 1.

Figure 4B:
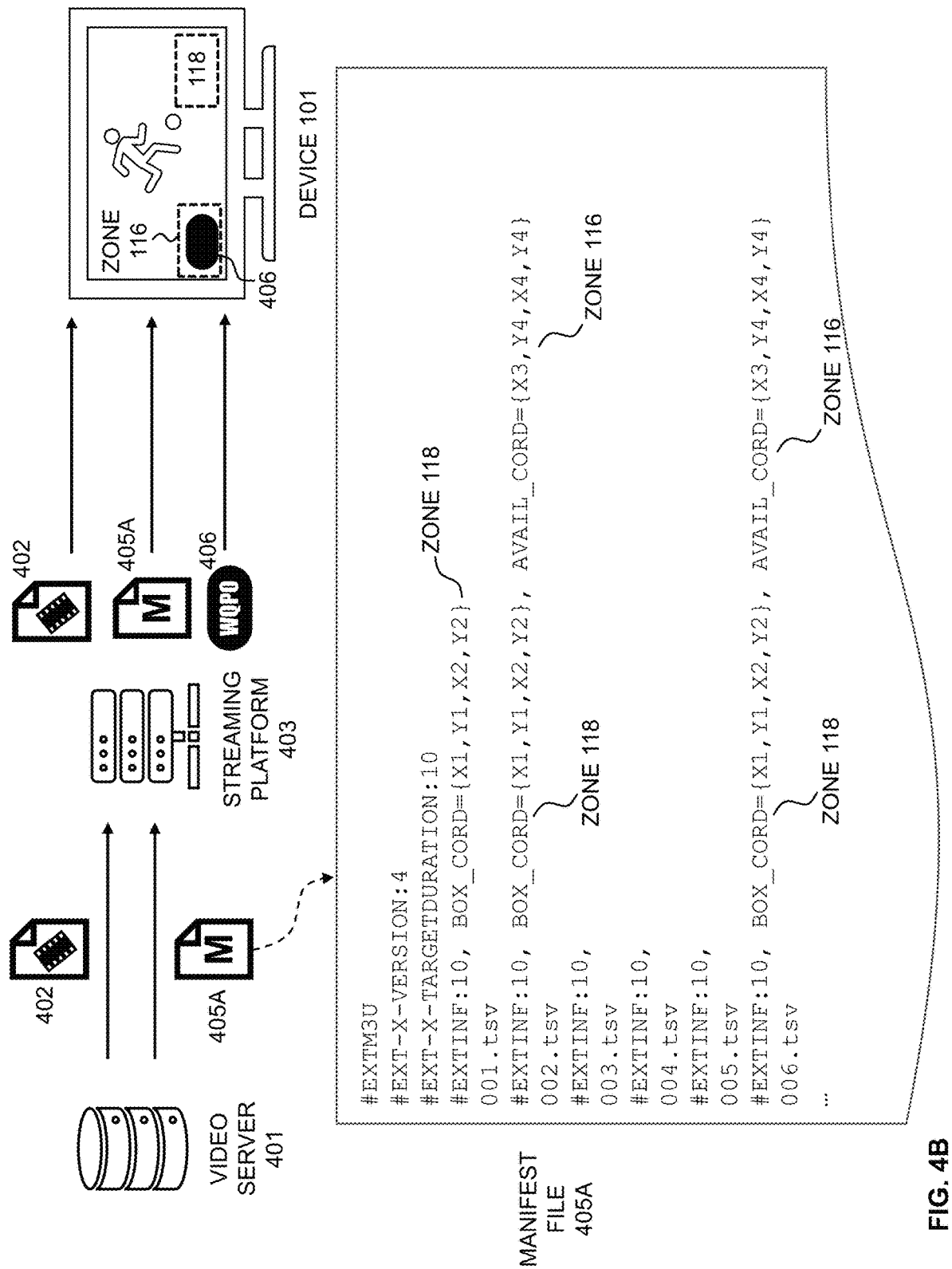
FIG. 4B depicts an illustrative flow diagram of a process for providing content with a manifest with coordinates, in accordance with some embodiments of the disclosure.
Figure 4C:
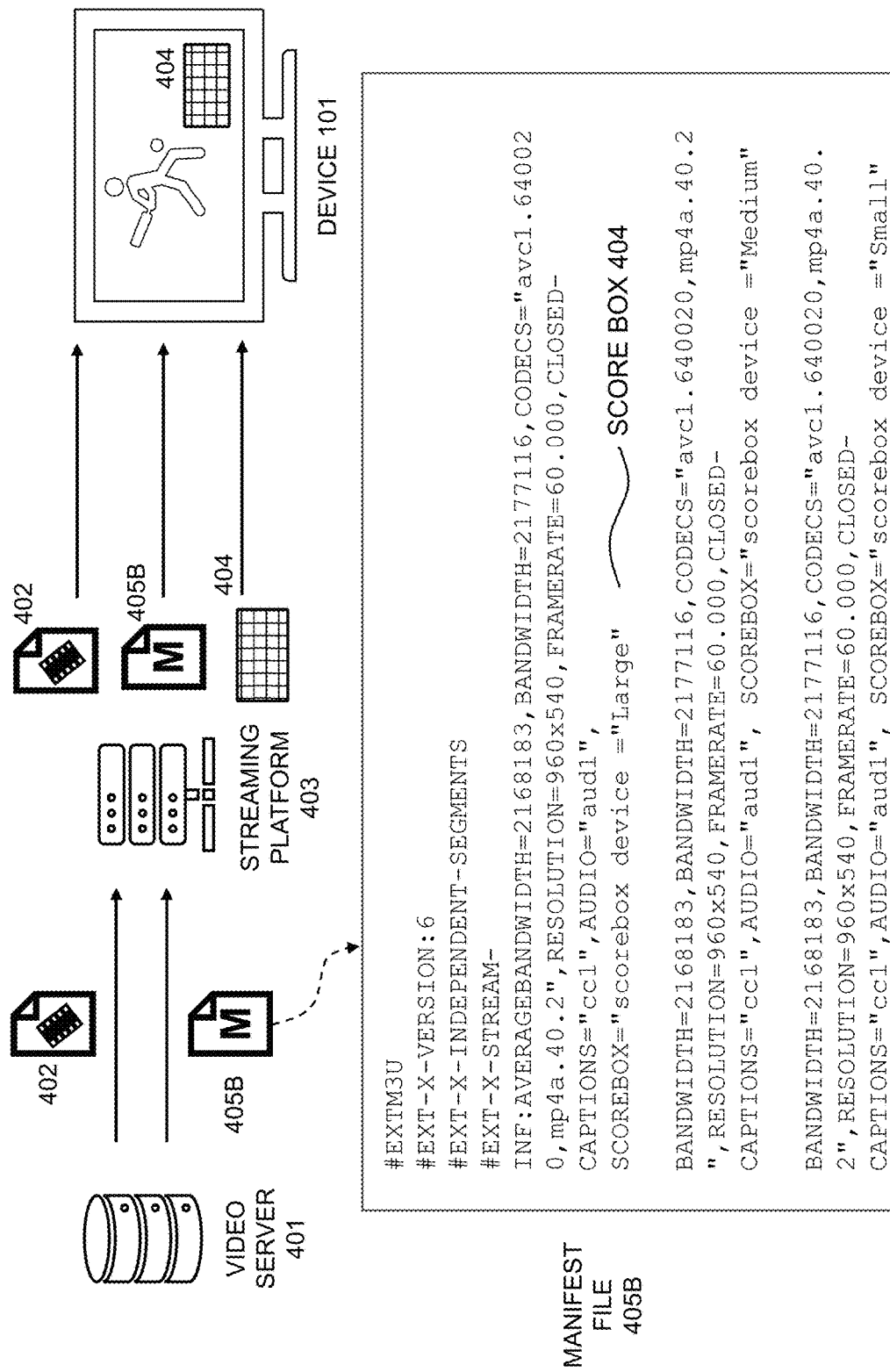
FIG. 4C depicts an illustrative flow diagram of a process for providing content with a manifest with an overlay, in accordance with some embodiments of the disclosure.
Figure 4D:
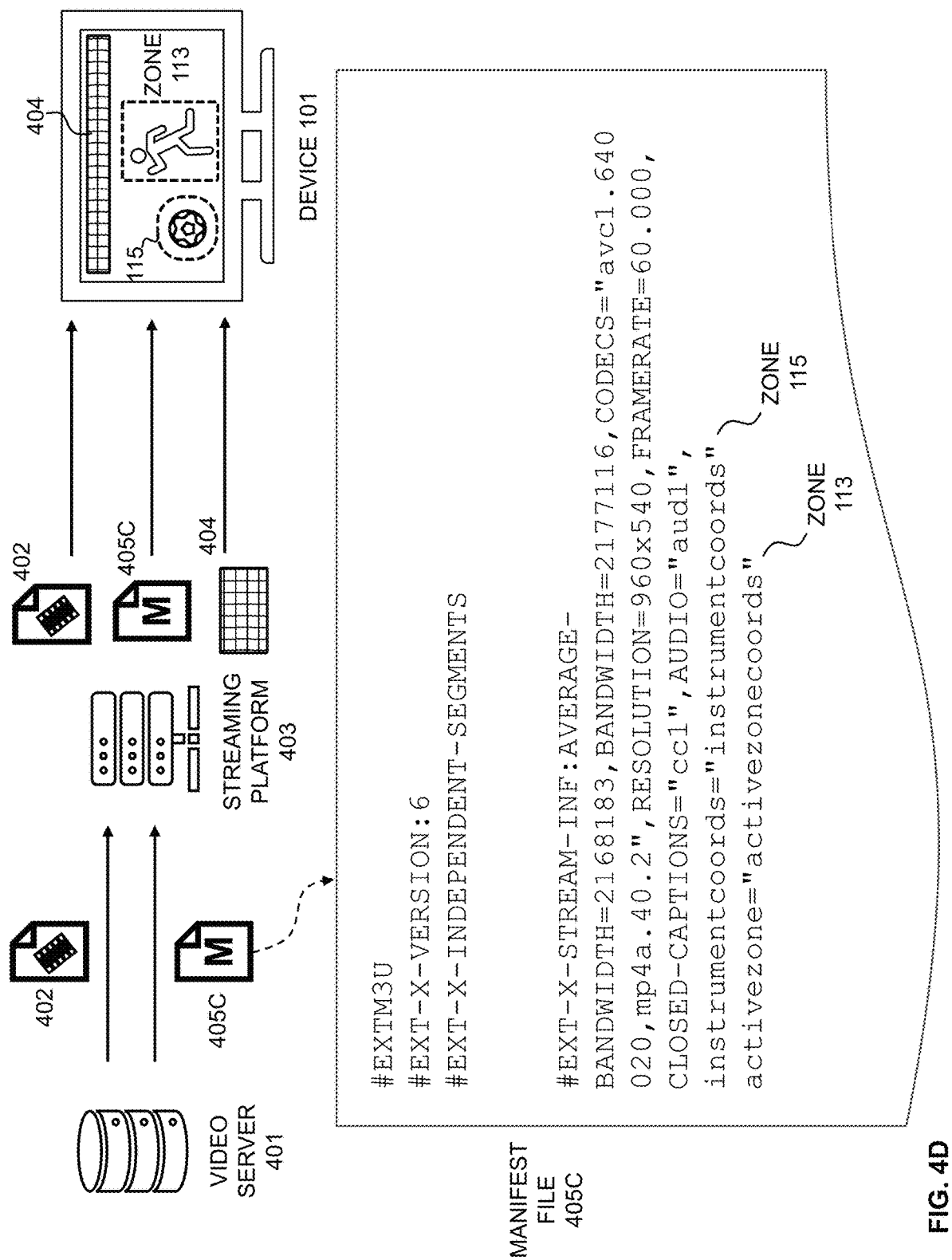
FIG. 4D depicts an illustrative flow diagram of a process for providing content with a manifest with an active zone, in accordance with some embodiments of the disclosure.

FIGS. 4B-D each depict an illustrative flow diagram of a process for providing content with a manifest, in accordance with some embodiments of the disclosure. FIG. 4B depicts an illustrative flow diagram of a process for providing content with a manifest with coordinates; FIG. 4C depicts an illustrative flow diagram of a process for providing content with a manifest with an overlay; and FIG. 4D depicts an illustrative flow diagram of a process for providing content with a manifest with an active zone. FIGS. 4B-D each depict a content delivery network comprising video server 401, streaming platform 403, and device 101. Generally, for instance, content 402 may be transmitted via a content delivery network comprising video server 401 to streaming platform 403 to device 101. In FIGS. 4B-D, content 402 is stored in memory at video server 401 and accessed by streaming platform 403 for delivery to device 101. Overlays may be any text or graphics rendered or displayed by the interface, e.g., interface 410 as depicted in FIG. 4A. An exemplary overlay may be logo 406. Logo 406, in some embodiments, may be provided by streaming platform 403, e.g., as a uniform resource location (URL) to download as an overlay for display by an interface. In some cases, a manifest file may contain information to access or download an overlay such as logo 406 or score overlay 404.

In some embodiments, metadata or a manifest file, such as manifest file 405A-C of FIGS. 4B-D, may be transmitted with or prior to transmission of content 402. In some embodiments, content 402 may comprise a plurality of segments, each segment a small content file, with a corresponding manifest identifying the segments to be downloaded and played in order like a playlist. Some embodiments may use adaptive bitrate streaming over HTTP (e.g., MPEG-DASH, HTTP Live Streaming, etc.) where the source content is encoded at multiple bitrates and each of the different bit rate streams is segmented into smaller parts of several seconds. A manifest file, such as manifest file 405A-C of FIGS. 4B-D, may describe available stream segments (e.g., as a playlist) and respective bit rates. An adaptive bitrate algorithm may be performed at a client, e.g., device 101, to decide which level of bit rate segments to download based on a current network state. For instance, device 101 may request high bitrate content segments when a network has high bandwidth available, but if device 101 finds that the network throughput has deteriorated, device 101 may request a lower bit rate segment or segments until network quality improves. In some embodiments, encoded content segments are stored at video server 401 for transmission to and decoding at device 101, as connected or facilitated by streaming platform 403. In some embodiments, a manifest file, such as manifest file 405A, 405B, or 405C, may be stored at video server 401 and passed on to device 101 via streaming platform 403 upon request. In some embodiments, a manifest file, such as manifest file 405A, 405B, or 405C, may be stored at streaming platform 403 and transmitted to device 101 upon request.

In some embodiments, such as the scenario depicted in FIG. 4B, content may be provided with a manifest describing screen coordinates to be used in determining where to place an overlay. Zones may be set by coordinates defining a shape such as a rectangle, e.g., with the top-left coordinates and bottom-right coordinates identified in the manifest. In some embodiments, a manifest may include coordinates for where an overlay may be produced, e.g., without overlapping something important on screen. For instance, FIG. 4B illustrates that zone 116 on screen of device 101 is available because, e.g., an additional score box or other info box is permitted to be there, and manifest file 405A identifies that "AVAIL_CORD={X3,Y4,X4,Y4}" is available for overlay. FIG. 4B illustrates logo 406 overlaying content in zone 116 without covering an info box.

In some embodiments, a manifest may include coordinates for where an overlay may not be produced because, e.g., it may overlap an information box. For instance, FIG. 4B illustrates that zone 118 on screen of device 101 is unavailable because, e.g., a score box or other info box may be there, and manifest file 405A identifies that "BOX_CORD={X1,Y1,X2,Y2}" are unavailable for overlay. In some scenarios, such as those depicted in FIG. 4B, an overlay may be placed in a preferred zone 116 or placed anywhere outside of zone 118. For instance, a closed caption overlay or a news ticker overlay may be placed so as not to cover zone 118 where an info box may already be. In some embodiments, a manifest may include coordinates where or where not to produce an overlay for one or more segments listed within the manifest.

In some embodiments, a manifest may include multiple coordinates for where an overlay may be produced in a priority order, e.g., in case there are multiple overlays or preferred locations. In some embodiments, a manifest may include coordinates where or where not to produce an overlay, e.g., as a variable identified by an interface, server, platform, or other means of conveying on-screen location placement. In some embodiments, a manifest may include an address (e.g., a URL) to download text, graphics, and/or video as an overlay (e.g., logo 406 and/or score box 404) to display by the interface, e.g., interface 410 as depicted in FIG. 4A.

In some embodiments, such as the scenario depicted in FIG. 4C, content may be provided with a manifest describing an overlay such as a score box. For instance, manifest file 405B of FIG. 4C describes three options for a score box overlay, e.g., "Large," "Medium," and "Small." In some embodiments, an interface, such as interface 410 of FIG. 4A, may determine which size score box overlay to use based on the size and/or resolution of the device. For instance, a large overlay may be displayed on device 101 of FIG. 4C based on it being a large television with high resolution (e.g., 1080P or 4K). Score box 104C depicted on device 101C of FIG. 4A may be a large score box overlay. Score box 104B depicted on device 101B of FIG. 4A may be a small score box overlay, e.g., intended for a smartphone or tablet. Score box 104A depicted on device 101A of FIG. 4A may be, e.g., a medium score box overlay suitable for larger televisions during times of activity in the content.

Some embodiments may include identification of one or more zones where an instrument or activity is found. For instance, FIG. 4D depicts an illustrative flow diagram of a process for providing content with a manifest with an instrument zone and an active zone. An instrument zone may be a zone on a screen where a key instrument of the content is tracked. For instance, a key instrument might be a ball, bat, base, goal, golf club, favorite or key player, important character, actor, speaker, or important device or person important to the content. An activity zone, for example, may be an area of the screen where an action occurs, such as pitching, shooting, striking of a ball, speaking, running, or otherwise performing. In some embodiments, an instrument zone and an active zone may be defined by a manifest for portions or segments of content and may change (or disappear). Zones may be set by coordinates defining a shape such as a rectangle, e.g., with the top-left coordinates and bottom-right coordinates identified in the manifest. In some embodiments, zones may be set by a coordinate defining the center of a circular shape identified in the manifest, e.g., with a radius in the manifest or set as a default by an interface. For example, in manifest file 405C of FIG. 4D, zone 115 is identified as an instrument zone with instrumentcoords="instrumentcoords" and zone 113 is identified as activezone="activezonecoords" where score overlay 404 should not be rendered. In such a scenario as depicted in FIG. 4D, score box overlay 404 is depicted at the top of the screen, not overlaying zone 115 or zone 113, as dictated by manifest file 405C.

Figure 5E:
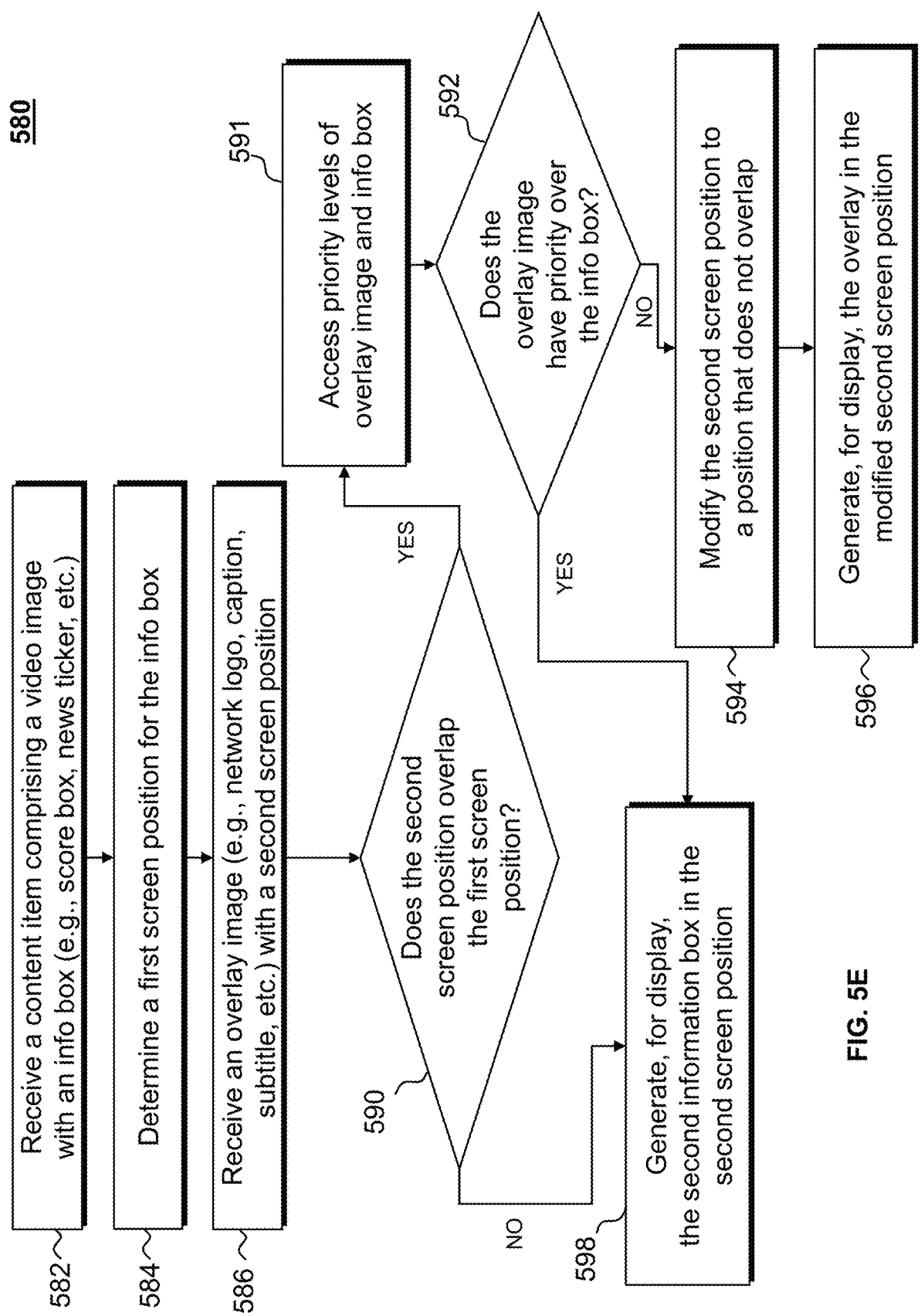
FIG. 5E depicts an illustrative flowchart of a process for relocating an overlay based on priority, in accordance with some embodiments of the disclosure.
Figure 5F:
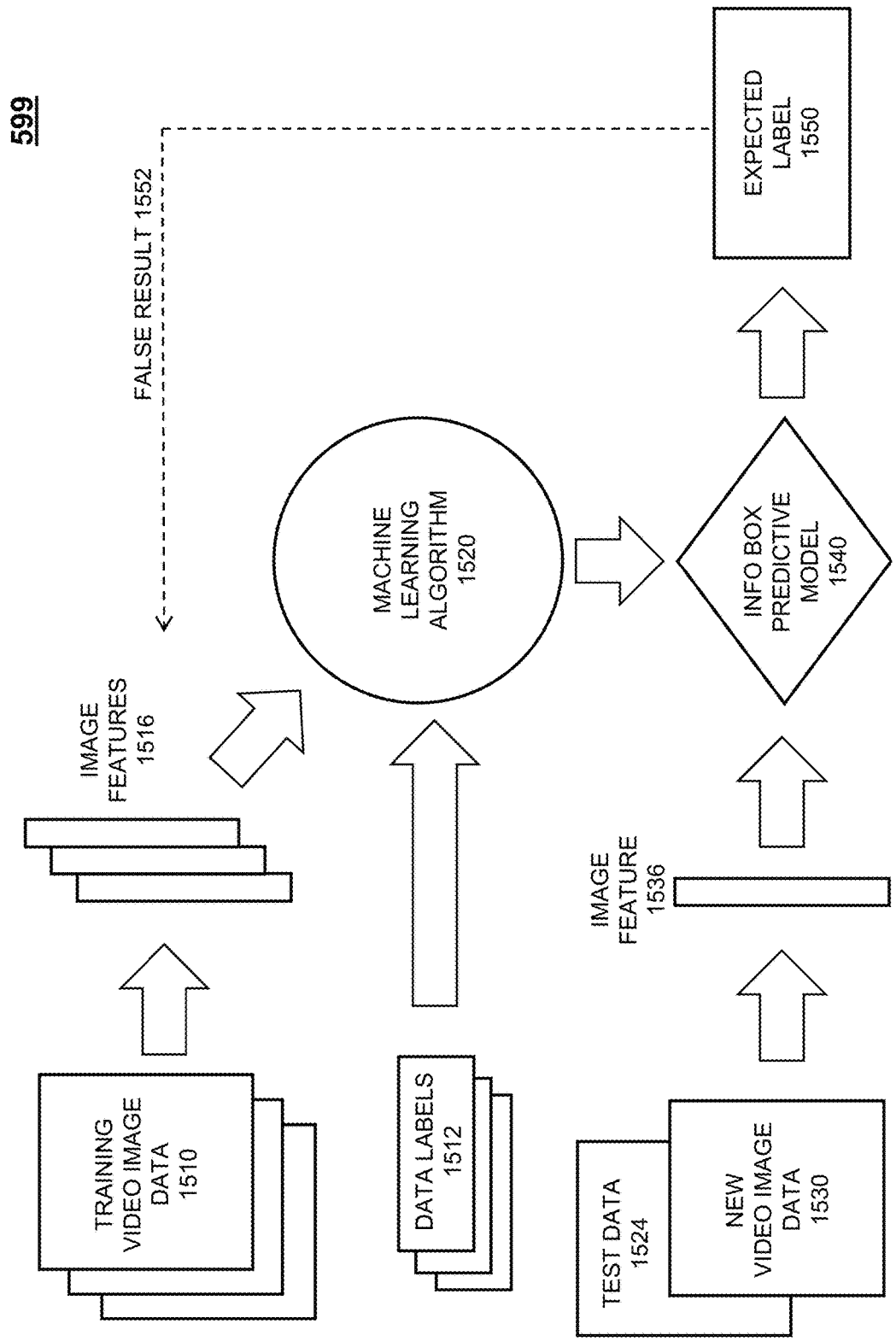
FIG. 5F depicts an illustrative flow diagram of a process for training a machine learning model to detect information boxes in video image data, in accordance with some embodiments of the disclosure.

FIG. 5A depicts an illustrative flowchart of a process for relocating an overlay, in accordance with some embodiments of the disclosure. There are many ways to position an overlay, and process 510 of FIG. 5A is an exemplary method to modify the screen position of an overlay that overlaps an information box, such as sports scores, stock tickers, or news banners. For instance, an overlay may have to be repositioned if it was intended to occupy the same part of the screen as the score of a baseball game.

Some embodiments may utilize an overlay engine to perform one or more parts of process 510, e.g., as part of a content delivery platform or interactive content guidance application, stored and executed by one or more of the processors and memory of a device and/or server such as those depicted in FIGS. 6 and 7. For instance, an overlay engine may run on a server of a content delivery platform like a streaming service. An overlay engine may run on a component of a television, set-top box, computer, smartphone, tablet, or other device able to access a content delivery network.

At step 512, the overlay engine receives a content item comprising a video image with an information box. For instance, an interactive guidance application may receive a soccer game with a score box, such as depicted in FIG. 1. By way of another non-limiting example, a device may receive a market news show with a stock ticker, such as depicted in FIG. 2. An information box may be on-screen text or graphics with information relevant to the content depicted. An info box may be seen, for example, in the form of sports score information, such as score box 104 in FIG. 1, or a news ticker, such as stock ticker 204 in FIG. 2 or sports ticker 304 in FIG. 3, or other on-screen information. An info box conveys valuable and/or relevant information on screen and is not meant to be covered with an additional overlay. In some embodiments, an info box may be included as part of the content. In some embodiments, an info box may be separate but displayed with the content.

At step 514, the overlay engine determines a first screen position for the info box. In some embodiments, the overlay engine determines the location of, for instance, a score box or a stock ticker. In some cases, metadata associated with the received content will identify a region or screen coordinates where the info box appears. For example, a content item may have a streaming manifest with XML code identifying the coordinates of the box around the score box for the content item. In some cases, metadata associated with a content item may be accessed or transmitted and interpreted to find the screen location of the information box. FIG. 5B depicts an illustrative flowchart of a process for determining a screen position of an information box in a video image.

In some embodiments, at step 514, determination of the location of an info box may require visual processing and analysis. For instance, an info box may be identified using feature analysis and identifying the box shape. In some embodiments, an info box may be identified by stationary text and using OCR. In some cases, an info box may be identified by comparing a plurality of frames and determining what shapes and/or text do not change from frame to frame. In some embodiments, identifying that part of a frame includes an information box (e.g., a score box or a stock ticker) can be applied to a full image to determine a zone, subsection, and/or coordinates of the image that contain an information box. FIG. 5C depicts an illustrative flowchart of an exemplary process for determining a screen position of an information box in a video image.

In some embodiments, at step 514, a machine learning algorithm may be applied to a neural network to generate a predictive model able to identify information boxes. FIG. 5F describes a process to train a model to label and/or categorize video images including information boxes. In some embodiments, a combination of a neural network and image analysis may be used to determine coordinates of an info box.

At step 516, the overlay engine receives an overlay image and a second screen position. An overlay image may be graphics or text intended to overlay the received content and be presented while the content is provided. An overlay image may be a network identifier, channel logo, platform/app icon, captions, subtitles, sponsor logo, notification, or other graphics or text. For example, in FIG. 1, logo 106 is an overlay; in FIG. 2, closed caption 206 is an overlay; and, in FIG. 3, notifications 206 and 326 are overlays.

Overlays may come with instructions on where to be positioned on a screen. For instance, an overlay may include a screen position such as screen coordinates or a selected screen region. In some embodiments, an overlay screen position may be conveyed separately or have a default position. A screen position could be as simple as selecting one of the four corners of the screen. A screen position could require selection of one of several equal-shaped regions of a screen. Overlay screen positions are typically agnostic of what will be covered when overlaying content.

At step 520, the overlay engine determines if the overlay's screen position overlaps the info box's screen position. For instance, the overlay engine determines if the second screen position overlaps the first screen position. The overlay engine may have the coordinates or screen region delivered with the overlay (in step 516). In some embodiments, the overlay engine may compare regions or coordinates of each of the second screen position (overlay) and the first screen position (info box). Determining if the overlay screen position overlaps with the info box screen position may be accomplished in several ways. Process 570, depicted in FIG. 5D, is a method for determining if there is screen overlap. In some embodiments, e.g., where overlay coordinates are not readily available, to determine if the info box is obscured by the overlay, the overlay engine may compare a video frame without the overlay to the video frame with the overlay to see if the info box is visible. Such instances may use some image analysis steps described in FIGS. 5B and 5C and/or a neural network described in FIG. 5F.

At step 522, if the overlay engine determines the second screen position does not overlap the first screen position, the overlay engine generates, for display, the second information box in the second screen position as planned. If the overlay does not overlap the info box, then the overlay engine renders the overlay over the content without modification.

At step 524, if the overlay engine determines the second screen position does overlap (e.g., a portion of) the first screen position, the overlay engine modifies the second screen position to a position that does not overlap. In some embodiments, modifying screen position may comprise translating, flipping, shrinking, enlarging, or otherwise moving the overlay position on the screen. In some embodiments, modifying screen position may comprise changing the coordinates of the center of the overlay to flip (invert) the second screen position to an opposite screen position, e.g., vertically or horizontally (or both). For instance, if a coordinate system is applied to a screen with the origin at the exact center of the screen, flipping coordinates of, e.g., the center of an overlay from right side to left side (or vice-versa) would be inverting the x-coordinate. Likewise, flipping an overlay from the screen bottom to the top (or vice-versa) would be inverting the y-coordinate. Flipping an overlay to an opposite corner, e.g., translating the overlay from the bottom-left of the screen to the top-right, would require inverting each of the y-coordinate and the x-coordinate.

In some embodiments, modifying placement of an overlay may involve zones of a screen. For instance, a screen may be divided into nine roughly equal, rectangular zones. Each zone may be ranked by preference for overlay screen position and, when the zone overlaps an on-screen info box, modification can include advancing to the next zone. For example, if zones 1-9 are labeled left to right and top to bottom, in a 3-by-3 rectangle, when an overlap is determined in zone 9 (bottom-right), an overlay may be moved to zone 7 (bottom-left corner) or zone 1 (top-left corner) or zone 3 (top-right corner) based on preferred ranking. In some embodiments, such as scenario 100 of FIG. 1, there may only be four zones, such as a zone for each of the four corners.

In some embodiments, there may be three horizontal zones. For instance, where tickers and/or subtitles may be used, zoning by horizontal rectangles, e.g., top, middle, and bottom, may be beneficial. When overlap occurs in the bottom zone, an overlay may be moved to the top zone, and vice versa. Scenario 200 of FIG. 2 depicts a situation with top and bottom zones. In some embodiments, the overlay engine may use five (ranked) horizontal zones.

At step 526, the overlay engine generates, for display, the overlay in the modified second screen position. The overlay engine renders the overlay over the content at the modified screen position so the overlay does not cover the info box identified at the first screen position. For example, interface 111 of FIG. 1 depicts logo 106 in the bottom-left corner instead of the bottom-right corner where score box 104 resides. By way of another non-limiting example, interface 211 of FIG. 2 depicts closed caption 206 in the top of the screen instead of the bottom where stock ticker 204 resides. As another example, interface 311 of FIG. 3 depicts notification 306 in the bottom of the screen instead of the top where sports ticker 304 is displayed.

FIG. 5B depicts an illustrative flowchart of a process for determining a screen position of an information box in a video image, in accordance with some embodiments of the disclosure. There are many ways to determine a screen position of an information box, and process 550 of FIG. 5B is an exemplary method. Some embodiments may utilize an overlay engine to perform one or more parts of process 550, e.g., as part of a content delivery platform or interactive content guidance application.

At step 552, the overlay engine receives a content item with a video image including an info box. For instance, an interactive guidance application may receive a soccer game with a score box, such as depicted in FIG. 1. By way of another non-limiting example, a device may receive a market news show with a stock ticker, such as depicted in FIG. 2. An information box may be on-screen text or graphics with information relevant to the content depicted. An information box may be seen, for example, in the form of sports score information, such as score box 104 in FIG. 1, or a news ticker, such as stock ticker 204 in FIG. 2 or sports ticker 304 in FIG. 3, or other on-screen information. An info box conveys valuable and/or relevant information on screen and is not meant to be covered with an additional overlay. In some embodiments, an info box may be included as part of the content. In some embodiments, an info box may be separate but associated with the content.

At step 554, the overlay engine accesses associated metadata or manifest for content item. Content typically includes metadata. In some cases, metadata associated with the content may be accessed or transmitted and interpreted to find the screen location of the information box. In some embodiments, metadata associated with the received content may identify a region or screen coordinates where an info box appears on screen. In compatible systems, metadata can be programmed to identify where on-screen information may reside by, e.g., zone or coordinates. Streaming content may use a manifest file that may describe available stream segments and respective bit rates. A manifest may act as a playlist for downloading and playing smaller video segments. A manifest may also include other information about the video and could be programmed to include screen position of an info box. For instance, the received content may include a streaming manifest with XML code identifying the coordinates of a box appearing around an info box for the entire duration of content. In some cases, the info box may change position and the metadata or manifest will reflect the change. Manifest file 405A of FIG. 4B includes coordinates of zones that should or should not have overlays. Manifest file 405C of FIG. 4D includes coordinates of instrument zones and/or activity zones that should not have overlays.

At step 556, the overlay engine analyzes associated metadata or manifest for info box position data. In some embodiments, the overlay engine reads the metadata associated with the received content to identify a region (or screen coordinates) where an info box appears on screen. In some embodiments, the overlay engine may parse the XML code of the streaming manifest to identify a screen position (e.g., coordinates) of an info box (or instrument zone or activity zone). Manifest file 405A of FIG. 4B includes coordinates of zone 116 that could have an overlay (e.g., available) and zone 118 that should not have an overlay (e.g., info box). Manifest file 405C of FIG. 4D includes coordinates of instrument zone 115 and activity zone 113, each of which should not have overlays covering the zone.

At step 558, the overlay engine determines a first screen position based on info box position data. For instance, the overlay engine may produce coordinates or a region of the screen as the "first screen position" describing the location of the info box. In some embodiments, the overlay engine may produce a zone position of the info box. For example, if zones 1-9 are labeled left to right and top to bottom, in a 3-by-3 rectangle, identifying a zone for the info box may be simpler for relocating an overlay. In some embodiments, the overlay engine may receive a region or zone for the info box, such as bottom-right of the screen, and have to translate the region into coordinates. The screen may be considered a two-dimensional coordinate plane with the origin at the very center. In some embodiments, the overlay engine may produce coordinates of the center of the info box, so that overlays are moved to opposite sides or corners. In some embodiments, the overlay engine may produce coordinates of a rectangle framing the info box, so that overlays may be moved more precisely without overlap.

FIG. 5C depicts an illustrative flowchart of a process for determining a screen position of an information box in a video image, in accordance with some embodiments of the disclosure. There are many ways to determine a screen position of an information box, and process 560 of FIG. 5C is an exemplary method to identify an info box by analyzing image features. Some embodiments may utilize an overlay engine to perform one or more parts of process 560, e.g., as part of a content delivery platform or interactive content guidance application.

At step 562, the overlay engine receives a content item. For instance, an interactive guidance application may receive a soccer game with a score box, such as depicted in FIG. 1. By way of another non-limiting example, a device may receive a market news show with a stock ticker, such as depicted in FIG. 2. An information box may be on-screen text or graphics with information relevant to the content depicted. An info box may be seen, for example, in the form of sports score information, such as score box 104 in FIG. 1, or a news ticker, such as stock ticker 204 in FIG. 2 or sports ticker 304 in FIG. 3, or other on-screen information. In some embodiments, an info box may be included as part of the content image.

At step 564, the overlay engine extracts a video image from content item. For instance, the overlay engine extracts a video frame from the content item as an image for analysis.

At step 566, the overlay engine analyzes the video image for features to identify info box position data. In some embodiments, an info box may be identified using feature analysis and identifying the box shape or text. In some embodiments, an info box may be identified by stationary text and using OCR. In some cases, score box 104 may be identified by comparing a plurality of frames and determining what shapes and/or text do not change from frame to frame. In some embodiments, identifying that part of a frame includes an information box (e.g., score box) can be applied to a full image to determine a zone, subsection, and/or coordinates of the image that contain an information box. In some embodiments, a machine learning algorithm may be applied to a neural network to generate a predictive model able to identify information boxes like score box 104. FIG. 5F describes a process to train a model to label and/or categorize video images including information boxes. In some embodiments, a combination of a neural network and image analysis may be used to determine coordinates of an info box. For instance, a neural network may be used to identify if a subsection of a frame includes an info box, and image analysis tools can match the subsection to a region of the frame and eventually determine the coordinates.

At step 568, the overlay engine determines a first screen position based on the info box position data. For instance, the overlay engine may produce coordinates or a region of the screen as the "first screen position" describing the location of the info box. This may be done practically by identifying a subsection of the image where the identified feature(s) of the info box is located.

In some embodiments, the overlay engine may produce a zone position of the info box. For example, if zones 1-9 are labeled left to right and top to bottom, in a 3-by-3 rectangle, identifying a zone for the info box may be simpler for relocating an overlay. In some embodiments, the overlay engine may receive a region or zone for the info box, such as bottom-right of the screen, and have to translate the region into coordinates. The screen may be considered a two-dimensional coordinate plane with the origin at the very center. In some embodiments, the overlay engine may produce coordinates of the center of the info box, so that overlays are moved to opposite sides or corners. In some embodiments, the overlay engine may produce coordinates of a rectangle framing the info box, so that overlays may be moved more precisely without overlap.

FIG. 5D depicts an illustrative flowchart of a process for determining screen overlap, in accordance with some embodiments of the disclosure. There are many ways to determine an overlap of screen positions of an information box and an overlay, and process 570 of FIG. 5D is an exemplary method. Some embodiments may utilize an overlay engine to perform one or more parts of process 570, e.g., as part of a content delivery platform or interactive content guidance application.

At step 572, the overlay engine receives a first screen position for an info box presented in a content item (e.g., video) and a second screen position of an overlay to be presented on the content item. In some embodiments, a first screen position may be determined by analyzing metadata or a streaming manifest, such as process 550 of FIG. 5B. In some embodiments, a first screen position may be determined by image extraction and analysis, such as process 560 of FIG. 5C. A second screen position describing the position of the overlay may be generally found as instructions in where to place the overlay. For example, an application may receive instructions on where to place an overlay from a content server in HTML or XML instruction. In some embodiments, instructions may be found in the metadata of the overlay. In some embodiments, for example where there are no coordinates or instructions, a second screen position may be determined like the first screen position.

At step 574, the overlay engine determines screen coordinates associated with each of the first screen position and the second screen position. Generally, a screen may be considered a two-dimensional coordinate plane with the origin at the center. In some embodiments, coordinates may be provided for one or both of the info box or the overlay; however, coordinate systems may have to translate or scale appropriately to ensure the first and second screen positions are in the same coordinate system. In some embodiments, the overlay engine may produce coordinates for the center of an info box or an overlay. In some embodiments, coordinates may describe the outlines of each of the overlay and the info box.

At step 576, the overlay engine compares determined screen coordinates. For instance, comparing the center coordinates of an info box with the center coordinates of the overlay may indicate how close together they are and the likelihood of overlap. By way of a non-limiting example, if both the info box (e.g., score box 104 of FIG. 1) and an overlay (e.g., logo 106 of FIG. 1) are in the bottom-right corner, it may be too close for comfort and the overlay position may need modification. Likewise, if both the info box (e.g., stock ticker 204 of FIG. 2) and an overlay (e.g., closed caption 206 of FIG. 2) are in the screen bottom, it also may be too close to distinguish and the overlay position may need modification. In some embodiments, a partial overlap or a near overlap may be acceptable. In some embodiments, coordinates of each image may be analyzed to determine if any portion of the overlay actually overlaps the info box.

At step 578, the overlay engine determines if there is overlap based on comparison of screen coordinates. In some embodiments, overlap may require actual overlap of coordinates. In some embodiments, overlap may be established when the coordinates are close enough. For example, in some embodiments, screen zones may be defined and if both the info box and overlay are determined to be in the same zone, overlap may be concluded. Zones might be established by coordinates defining the four corners or a set of horizontal bars as described above.

FIG. 5E depicts an illustrative flowchart of a process for relocating an overlay based on priority, in accordance with some embodiments of the disclosure. There are many ways to position an overlay, and process 580 of FIG. 5E is an exemplary method to modify the screen position of an overlay that overlaps an information box, such as sports scores, stock tickers, or news banners. For instance, a notification overlay may have to be repositioned if it was intended to occupy the same part of the screen as the sports ticker of a sports news program depending on priority of the notification. Some embodiments may utilize an overlay engine to perform one or more parts of process 580, e.g., as part of a content delivery platform or interactive content guidance application, stored and executed by one or more of the processors and memory of a device and/or server such as those depicted in FIGS. 6 and 7.

At step 582, the overlay engine receives a content item comprising a video image with an information box. For instance, an interactive guidance application may receive a sports news program with a sports tracker, such as depicted in FIG. 3. An information box may be on-screen text or graphics with information relevant to the content depicted. In some embodiments, an info box may be included as part of the content. In some embodiments, an info box may be separate but displayed with the content.

At step 584, the overlay engine determines a first screen position for the info box. In some embodiments, the overlay engine determines the location of, for instance, a score box or a stock ticker. FIG. 5B depicts an illustrative flowchart of a process for determining a screen position of an information box in a video image.

In some embodiments, at step 584, determination of the location of an info box may require visual processing and analysis. For instance, an info box may be identified using feature analysis and identifying the box shape. FIG. 5C depicts an illustrative flowchart of an exemplary process for determining a screen position of an information box in a video image. In some embodiments, at step 584, a machine learning algorithm may be applied to a neural network to generate a predictive model able to identify information boxes. FIG. 5F describes a process to train a model to label and/or categorize video images including information boxes. In some embodiments, a combination of a neural network and image analysis may be used to determine coordinates of an info box.

At step 586, the overlay engine receives an overlay image and a second screen position. An overlay image may be graphics or text intended to overlay the received content and be presented while the content is provided. An overlay image may be a network identifier, channel logo, platform/app icon, captions, subtitles, sponsor logo, notification, or other graphics or text. For example, in FIG. 3, notification 306 and notification 326 are each an overlay. Overlays may come with instructions on where to be positioned on a screen. For instance, an overlay may include a screen position such as screen coordinates or a selected screen region.

At step 590, the overlay engine determines if the overlay's screen position overlaps the info box's screen position. For instance, the overlay engine determines if the second screen position overlaps the first screen position. Process 570, depicted in FIG. 5D, is a method for determining if there is screen overlap.

At step 591, if the overlay engine determines the second screen position does overlap (e.g., a portion of) the first screen position, the overlay engine accesses priority levels for each of the overlay and the info box. In some embodiments, the info box may have a priority level based on associated content.

At step 592, the overlay engine determines if the overlay image has priority over the info box. In some embodiments, this determination may be a comparison of priority level values to determine which has the greater priority. For instance, priority levels may be a scale of 1-10, with 10 being the highest priority, or a scale of low, medium, and high. In some embodiments, a home security alarm may be a "high" priority or a rating between 8 and 10 on the scale of 1 to 10. In some embodiments, a reminder notification alerting a viewer to the start of a program in 15 minutes might be a "low" or "medium" priority or priority of 5 or lower on the scale of 1 to 10 depending on, for example, the program and the time until the program start. For instance, a sports news ticker may have a priority level 5 (on a 1 to 10 scale) and a program reminder (priority level 4) might be relocated while a home security alert (priority level 9) may be permitted to overlay the sports news ticker. In some embodiments, a content item may have a priority level 5, so an associated sports ticker may have a priority level based on that level, e.g., 5. In some embodiments, content 302 and/or ticker 304 may have a default priority level such as "medium" or 5 on a scale of 1 to 10.

At step 594, if the overlay engine determines the info box has priority over the overlay, the overlay engine modifies the second screen position to position that does not overlap. In some embodiments, modifying screen position may comprise translating, flipping, shrinking, enlarging, or otherwise moving the overlay position on the screen. In some embodiments, modifying placement of an overlay may involve zones of a screen, e.g., three horizontal zones. For instance, where tickers and/or subtitles may be used, zoning by horizontal rectangles, e.g., top, middle, and bottom, may be beneficial. When overlap occurs in the bottom zone, an overlay may be moved to the top zone, and vice versa. Scenario 300 of FIG. 3 depicts a situation with top and bottom zones.

At step 596, the overlay engine generates, for display, the overlay in the modified second screen position. The overlay engine renders the overlay over the content at the modified screen position so the overlay does not cover the info box identified at the first screen position. For example, interface 311 of FIG. 3 depicts notification 306 in the bottom of the screen instead of the top where sports ticker 304 is displayed.

At step 598, if the overlay engine determines the second screen position does not overlap the first screen position, the overlay engine generates, for display, the second information box in the second screen position as planned. If the overlay does not overlap the info box, or the overlay is determined to be high enough priority, then the overlay engine renders the overlay over the content at the designated position without modification. For example, interface 321 of FIG. 3 depicts notification 326 in the top of the screen, covering where sports ticker 304 is displayed, because, e.g., a home security alert has priority over a sports ticker in the scenario. In some embodiments, a high-priority alert may be rendered and may flash, highlight, or animate to get a user's attention.

FIG. 5F depicts an illustrative flow diagram of a process for training a machine learning model to detect information boxes, such as scoreboard information boxes, scrolling stock tickers, news tickers, score tickers, information labels, etc., in video image data, in accordance with some embodiments of the disclosure. In some embodiments, detecting an info box may be accomplished with predictive modeling. For instance, a trained neural network may be used to classify a portion of provided video image data as either an info box or not an info box. Generally, a training set comprising video image data with info boxes may be used by a neural network to predict whether new video image data includes an info box or not.

Training a neural network to accurately detect info boxes may be accomplished in many ways. Some embodiments may use supervised learning where, e.g., a training data set includes labels identifying info boxes (and/or non-info boxes). Some embodiments may use unsupervised learning that may identify info boxes in training data by clustering similar data. Some embodiments may use semi-supervised learning where a portion of labeled video image data may be combined with unlabeled data during training. In some embodiments, a reinforcement learning may be used. With reinforcement learning, a predictive model is trained from a series of actions by maximizing a "reward function," via rewarding correct labeling and penalizing improper labeling. Scenario 599 includes data labels 1512, indicating a supervised or semi-supervised learning situation.

A location of an info box within a video frame may be determined, for instance, by determining if there is a subsection of a video image. In some embodiments, portions a video frame may be provided to a trained neural network for labeling, and the coordinates and/or dimensions of the subsection, labeled as including an info box, may be returned. Portions a video frame may be provided to a trained neural network as, e.g., image features. In some embodiments, labels returned by a trained neural network may include an area of the screen where the info box is located, such as coordinates or regions. A trained neural network may return a section numbered 1 through 9 or equal portions of a screen, e.g., numbered left to right, top to bottom where an info box is found. A trained neural network may return a labeled corner section, such as top-left or bottom right, where an info box is found. A trained neural network may return a labeled horizontal ticker section such as top or bottom (or even center).

Scenario 599 depicts training video image data 1510 along with data labels 1512. Training data for info box identification may be collected by manually labeling training video images with info boxes like sports scores, stock tickers, scrolling news banners, etc. Video image data without an info box, e.g., from a control group, may also be captured and used. In some circumstances, an analyst may mark incoming video data with an info box or non-info box label, e.g., in near real time, to create the training data set. From the video image data collected, at least two groups of data may be created: training video image data 1510 and test data 1524.

In scenario 599, training video image data 1510 is pre-processed using feature extraction to form training image features 1516. Pre-processing of training data is used to obtain proper data for training. In some embodiments, pre-processing may involve, for example, scaling, translating, rotating, converting, normalizing, changing of bases, and/or translating coordinate systems in video image data. In some embodiments, pre-processing may involve filtering video image data, e.g., to eliminate video image noise.

After pre-processing, training image features 1516 are fed into Machine Learning Algorithm (MLA) 1520 to generate an initial machine learning model, e.g., info box predictive model 1540. In some embodiments, MLA 1520 uses numbers between 0 and 1 to determine whether the provided data, e.g., training image features 1516, includes an info box or not. The more data that is provided, the more accurate MLA 1520 will be in creating a model, e.g., info box predictive model 1540.

Once MLA 1520 creates info box predictive model 1540, test data may be fed into the model to verify the system and test how accurately model 1540 behaves. In some embodiments, test data 1524 is pre-processed to become an image feature 1536 and passed to info box predictive model 1540 for a prediction. Info box predictive model 1540 identifies whether the input test data includes an info box or not. In some embodiments, each iteration of test data 1524 is classified and reviewed for accuracy. For example, if expected label 1550 is not correct, false result 1552 may be fed as learning data back into MLA 1520. If, after test data 1524 is classified and reviewed, model 1540 does not perform as expected (e.g., an error rate below 5%) then additional training data may be provided until the model meets the expected criteria. In some embodiments, a reinforcement learning method may be incorporated with test data to reward or punish MLA 1520.

Once info box predictive model 1540 works as expected, new real-time data may be fed to the model, and determinations of whether the data includes an info box may be predicted with confidence. For instance, in scenario 599, new video image data 1530 may be pre-processed as an image feature 1536 and passed to info box predictive model 1540 for a prediction. Info box predictive model 1540 may evaluate image feature 1536 and present a label of info box or no info box for the data. If new video image data can be verified outside the system, model 1540 may be further updated with feedback and reinforcement for further accuracy.

FIG. 6 is a diagram of an illustrative device, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614 (e.g., speakers or headphones), microphone 616, camera 618, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application overlay engine stored in memory (e.g., storage 608). Specifically, control circuitry 604 may be instructed by the application to perform the functions discussed above and below. For example, the application may provide instructions to control circuitry 604 to determine screen positions. In some implementations, any action performed by control circuitry 604 may be based on instructions received from the application.

In some client/server-based embodiments, control circuitry 604 includes communications circuitry suitable for communicating with an application server. An overlay engine may be a stand-alone application implemented on a device or a server. An overlay engine may be implemented as software or a set of executable instructions. The instructions for performing any of the embodiments discussed herein of the overlay engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, an overlay engine may be a client/server application where only the client application resides on device 600 (e.g., devices 702A-F), and a server application resides on an external server (e.g., server 706). For example, an overlay engine may be implemented partially as a client application on control circuitry 604 of device 600 and partially on server 706 as a server application running on control circuitry. Server 706 may be a part of a local area network with one or more of devices 702A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 706), referred to as "the cloud." Device 600 may be a cloud client that relies on the cloud computing capabilities from server 706 to provide content by the overlay engine. When executed by control circuitry of server 706, the overlay engine may instruct the control circuitry to generate the overlay engine output (e.g., content items and/or overlays) and transmit the generated output to one or more of devices 702A-F. The client application may instruct control circuitry of the receiving device 702A-F to generate the overlay engine output. Alternatively, one or more of devices 702A-F may perform all computations locally via control circuitry 604 without relying on server 706.

Control circuitry 604 may include communications circuitry suitable for communicating with an overlay engine server, a table or database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608, which is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610 and display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 612 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio equipment 614 may be provided as integrated with other elements of each one of device 600 and equipment 601 or may be stand-alone units. An audio component of videos and other content displayed on display 612 may be played through speakers (or headphones) of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. There may be a separate microphone 616 or audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a participant profile. In some embodiments, control circuitry 604 may calculate several scores, such as a readiness score, based on profile data. Control circuitry 604 may store scores in a database and the database may be linked to a user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across different devices.

In some embodiments, the application is a client/server-based application. Data for use by a thick or thin client implemented on each one of device 600 and equipment 601 is retrieved on demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, one or more of devices 702A-F may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 702A-F may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing content, the method comprising:
    receiving a content item, the content item comprising a video image;
    accessing a video manifest file for the content item, the video manifest file comprising a plurality of screen locations of the video image, each of the plurality of screen locations having a corresponding zone priority level identified in the video manifest file;
accessing an overlay priority level associated with an overlay;
identifying a first zone, unavailable for overlay of the video image, of the plurality of screen locations of the video manifest file based at least in part on the overlay priority level associated with the overlay not exceeding the corresponding zone priority level of the first zone identified in the video manifest file;
identifying a second zone, available for overlay of the video image, of the plurality of screen locations of the video manifest file based at least in part on the overlay priority level associated with the overlay meeting or exceeding the corresponding zone priority level of the second zone identified in the video manifest file; and
generating, for display, the overlay on the video image in a first screen position based on the identified second zone, wherein the first screen position does not overlay the first zone.

2. The method of claim 1, wherein the first zone is associated with a first segment of the content item.

3. The method of claim 2, further comprising displaying the generated overlay in the first screen position during the first segment of the content item.

4. The method of claim 1, the method further comprising:
determining a second zone in the video image based on the video manifest file associated with a second segment of the content item; and
generating, for display, the overlay on the video image in a second screen position based on the second zone during the second segment.

5. The method of claim 1, the method further comprising:
accessing a second overlay associated with rendering information;
accessing device information comprising screen size and resolution;
selecting an overlay, based on the rendering information and the device information, from the following: the overlay and the second overlay; and
generating, for display, the selected overlay on the video image.

6. The method of claim 1, wherein modifying comprises:
accessing, via the video manifest file, a second overlay and overlay rendering information for each of the overlay and the second overlay;
accessing device information comprising screen size and resolution;
selecting an overlay, based on the corresponding rendering information and the device information, from the following: the overlay and the second overlay; and
generating, for display, the selected overlay on the video image.

7. The method of claim 1, wherein receiving the overlay further comprises receiving the overlay from an address identified from the video manifest file and the overlay comprises text or graphics describing at least one from the following list: a network identifier, a platform identifier, sports information, financial information, calendar information, news information, closed captions, subtitle text, notifications, and advertisement information.

8. A system comprising:
input/output circuitry configured to:
receive a content item, the content item comprising a video image;
access a video manifest file for the content item, the video manifest file comprising a plurality of screen locations of the video image, each of the plurality of screen locations having a corresponding zone priority level identified in the video manifest file;
access an overlay priority level associated with an overlay;
processing circuitry configured to:
identify a first zone, unavailable for overlay of the video image, of the plurality of screen locations of the video manifest file based at least in part on the overlay priority level associated with the overlay not exceeding the corresponding zone priority level of the first zone identified in the video manifest file;
identify a second zone, available for overlay of the video image, of the plurality of screen locations of the video manifest file based at least in part on the overlay priority level associated with the overlay meeting or exceeding the corresponding zone priority level of the second zone identified in the video manifest file; and
generate, for display, the overlay on the video image in a first screen position based on the identified second zone, wherein the first screen position does not overlay the first zone.

9. The system of claim 8, wherein the first zone is associated with a first segment of the content item.

10. The system of claim 9, wherein the processing circuitry is further configured to display the generated overlay in the first screen position during the first segment of the content item.

11. The system of claim 8, wherein the processing circuitry is further configured to:
determine a second zone in the video image based on the video manifest file associated with a second segment of the content item; and
generate, for display, the overlay on the video image in a second screen position based on the second zone during the second segment.

12. The system of claim 8, wherein
the input/output circuitry is further configured to:
access a second overlay associated with rendering information;
access device information comprising screen size and resolution; and
the processing circuitry is further configured to:
select an overlay, based on the rendering information and the device information, from the following: the overlay and the second overlay; and
generate, for display, the selected overlay on the video image.

13. The system of claim 8, wherein the processing circuitry is further configured to modify by:
accessing, via the video manifest file, a second overlay and overlay rendering information for each of the overlay and the second overlay;
accessing device information comprising screen size and resolution;
selecting an overlay, based on the corresponding rendering information and the device information, from the following: the overlay and the second overlay; and
generating, for display, the selected overlay on the video image.

14. The system of claim 8, wherein the input/output circuitry is further configured to receive the overlay by receiving the overlay from an address identified from the video manifest file and the overlay comprises text or graphics describing at least one from the following list: a network identifier, a platform identifier, sports information, financial information, calendar information, news information, closed captions, subtitle text, notifications, and advertisement information.

\* \* \* \* \*